(12) United States Patent
Lee et al.

(10) Patent No.: US 12,174,287 B2
(45) Date of Patent: Dec. 24, 2024

(54) ELECTRONIC DEVICE FOR PERFORMING RANGING THROUGH ULTRA-WIDE BAND (UWB), AND METHOD FOR OPERATING ELECTRONIC DEVICE

(71) Applicant: Samsung Electronics Co., Ltd., Gyeonggi-do (KR)

(72) Inventors: Mingyu Lee, Gyeonggi-do (KR); Aditya Vinod Padaki, Richardson, TX (US); Zheda Li, Gyeonggi-do (KR); Seongah Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 523 days.

(21) Appl. No.: 17/421,580

(22) PCT Filed: Dec. 11, 2019

(86) PCT No.: PCT/KR2019/017495
§ 371 (c)(1),
(2) Date: Jul. 8, 2021

(87) PCT Pub. No.: WO2020/145526
PCT Pub. Date: Jul. 16, 2020

(65) Prior Publication Data
US 2022/0082676 A1   Mar. 17, 2022

Related U.S. Application Data

(60) Provisional application No. 62/815,589, filed on Mar. 8, 2019, provisional application No. 62/789,597, filed on Jan. 8, 2019.

(51) Int. Cl.
*G01S 13/02* (2006.01)
*G01S 13/10* (2006.01)

(52) U.S. Cl.
CPC ........ *G01S 13/0209* (2013.01); *G01S 13/103* (2013.01)

(58) Field of Classification Search
CPC ........................ G01S 13/0209; G01S 13/103
See application file for complete search history.

(56) References Cited

U.S. PATENT DOCUMENTS

| 8,451,766 B2 | 5/2013 | Lee et al. |
| 8,665,794 B2 | 3/2014 | Zhai et al. |
| (Continued) | | |

FOREIGN PATENT DOCUMENTS

| KR | 10-0650114 | 11/2006 |
| KR | 10-2009-0034711 | 4/2009 |
| (Continued) | | |

OTHER PUBLICATIONS

Naguib, A. (Apple), et al., "MAC for Secure Ranging", Project: IEEE P802.15 Working Group for Wireless Personal Area Networks (WPANs), Nov. 12, 2018, slides 1-14, 14 pages, doc.:<15-18-0540-00-004z> (Year: 2018).*

(Continued)

*Primary Examiner* — Bernarr E Gregory
*Assistant Examiner* — Hailey R Le
(74) *Attorney, Agent, or Firm* — The Farrell Law Firm, P.C.

(57) ABSTRACT

Provided is a method for stably and flexibly performing ranging between a plurality of devices. According to an embodiment, a method of operating a first device for performing ranging by using ultra-wide band (UWB) may include: transmitting a first ranging control (RC) frame to a second device; performing ranging with the second device for a number of ranging rounds determined based on the first RC frame; changing at least one ranging parameter based on a change request received from the second device; and transmitting a second RC frame including the changed at least one ranging parameter.

18 Claims, 22 Drawing Sheets

(56) References Cited

U.S. PATENT DOCUMENTS

| | | | |
|---|---|---|---|
| 9,622,110 B2 | 4/2017 | Lee et al. | |
| 9,826,376 B2 | 11/2017 | Rudolf et al. | |
| 2008/0137582 A1* | 6/2008 | Kim | H04W 74/002 |
| | | | 370/315 |
| 2019/0135229 A1* | 5/2019 | Ledvina | H04W 12/50 |
| 2020/0084706 A1* | 3/2020 | Yong | H04W 8/005 |

FOREIGN PATENT DOCUMENTS

| | | |
|---|---|---|
| KR | 10-1122416 | 3/2012 |
| KR | 10-2012-0031702 | 4/2012 |
| KR | 10-2014-0041481 | 4/2014 |
| KR | 10-1629856 | 6/2016 |

OTHER PUBLICATIONS

Samsung et al., "IEEE 802.15.4z MAC for Ranging", IEEE Draft, XP068148437, Dec. 21, 2018, 67 pages.
Samsung, "Adaptive Preamble Length Mode for UWB HRP Ranging", IEEE Draft, XP068129309, Sep. 12, 2018, 11 pages.
European Search Report dated Jan. 25, 2022 issued in counterpart application No. 19908217.3-1206, 11 pages.
International Search Report dated Mar. 27, 2020 issued in counterpart application No. PCT/KR2019/017495, 5 pages.
Written Opinion dated Mar. 27, 2020 issued in counterpart application No. PCT/KR2019/017495, 7 pages.

\* cited by examiner

FIG. 10

| Bits 2 | 4 | 1 | 1 | 1 | 6 | 6 | Octets: 2 | Octets: 2 | Octets: 1 |
|---|---|---|---|---|---|---|---|---|---|
| Cast Mode | Ranging Mode | Schedule Mode | Deferred Mode | Time Structure Indicator | Multiplier for Minimum Block Length | Number of Ranging Rounds | Minimum Block Length | Ranging Round Length | Ranging Slot Length |

FIG. 11

| Ranging Mode value<br>b3 b2 b1 b0 | Description |
|---|---|
| 0000 | non-secure OWR |
| 0001 | non-secure SS-TWR |
| 0010 | non-secure DS-TWR |
| 0011 | secure OWR with payload |
| 0100 | secure SS-TWR with payload |
| 0101 | secure DS-TWR with payload |
| 0110 | secure OWR without payload |
| 0111 | secure SS-TWR without payload |
| 1000 | secure DS-TWR without payload |
| 1001 – 1111 | Reserved |

FIG. 12

| Octets : 4 | 4 | 1 | 1 |
|---|---|---|---|
| Block Interval | Round Interval | RIU Interval | Remaining Number of RIU Frames |

FIG. 13

| Bits : 1 |
|---|
| ACK RFRAME Allowance |

ELECTRONIC DEVICE FOR PERFORMING RANGING THROUGH ULTRA-WIDE BAND (UWB), AND METHOD FOR OPERATING ELECTRONIC DEVICE

PRIORITY

This application is a National Phase Entry of PCT International Application No. PCT/KR2019/017495 which was filed on Dec. 11, 2019, and claims priority to U.S. Provisional Patent Application Nos. 62/789,597 and 62/815,589, which were filed on Jan. 8, 2019 and Mar. 8, 2019, respectively, the entire content of each of which is incorporated herein by reference.

TECHNICAL FIELD

The present disclosure relates to an electronic device for performing ranging by using ultra-wide band (UWB) communication and a method of operating the electronic device.

BACKGROUND ART

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server or the like. In order to implement the IoT, technology elements such as sensing technology, wired/wireless communication and network infrastructure, service interface technology, and security technology are required. Recently, technologies such as sensor networks, machine-to-machine (M2M) communication, and machine-type communication (MTC) for connection between objects have been researched.

In the IoT environment, intelligent Internet technology (IT) services may be provided to collect and analyze data obtained from connected objects to create new value in human life. As existing information technology (IT) and various industries merge and combine with each other, the IoT may be applied to various fields such as smart homes, smart buildings, smart cities, smart cars or connected cars, smart grids, health care, smart home appliances, and advanced medical services.

As various services may be provided according to the development of wireless communication systems, methods for effectively providing such services are required. For example, in medium access control (MAC), a ranging technology for measuring distances between electronic devices by using ultra-wide band (UWB) may be used. The UWB is a wireless communication technology that does not use a radio carrier and uses a very wide frequency band of several GHz or more in the baseband.

DESCRIPTION OF EMBODIMENTS

Technical Problem

A protocol for a plurality of devices to stably and flexibly perform ranging therebetween is required.

Solution to Problem

According to an embodiment, a method of operating a first device for performing ranging by using ultra-wide band (UWB) may include: transmitting a first ranging control (RC) frame to a second device; performing ranging with the second device for a number of ranging rounds determined based on the first RC frame; changing at least one ranging parameter based on a change request received from the second device; and transmitting a second RC frame including the changed at least one ranging parameter.

According to an embodiment, a method of operating a second device for performing ranging by using ultra-wide band (UWB) may include: receiving a first RC frame from a first device; performing ranging with the first device for a number of ranging rounds determined based on the first RC frame; transmitting change request information to the first device; and receiving a second RC frame based on at least one ranging parameter changed based on the change request information.

According to an embodiment, a first device for performing ranging by using ultra-wide band (UWB) may include: a communicator; a memory; and at least one processor controlling an operation of the first device by executing a program stored in the memory, wherein the at least one processor controls the communicator to transmit a first RC frame to a second device and to perform ranging with the second device for a number of ranging rounds determined based on the first RC frame, changes at least one ranging parameter based on a change request received from the second device, and controls the communicator to transmit a second RC frame including the changed at least one ranging parameter.

According to an embodiment, a second device for performing ranging by using ultra-wide band (UWB) may include: a communicator; a memory; and at least one processor controlling an operation of the second electronic device by executing a program stored in the memory, wherein the at least one processor controls the communicator to receive a first RC frame from a first device, perform ranging with the first device for a number of ranging rounds determined based on the first RC frame, transmit change request information to the first device, and receive a second RC frame based on at least one ranging parameter changed based on the change request information.

BRIEF DESCRIPTION OF DRAWINGS

FIG. 10 illustrates a content field format of a ranging control information element (IE) according to an embodiment.

FIG. 11 illustrates ranging mode field values according to an embodiment.

FIG. 12 illustrates a content field format of a ranging interval update information element (RIU IE) according to an embodiment.

FIG. 13 illustrates a content field format of a ranging acknowledgment information element (RA IE) according to an embodiment.

BEST MODE

Figure 1:
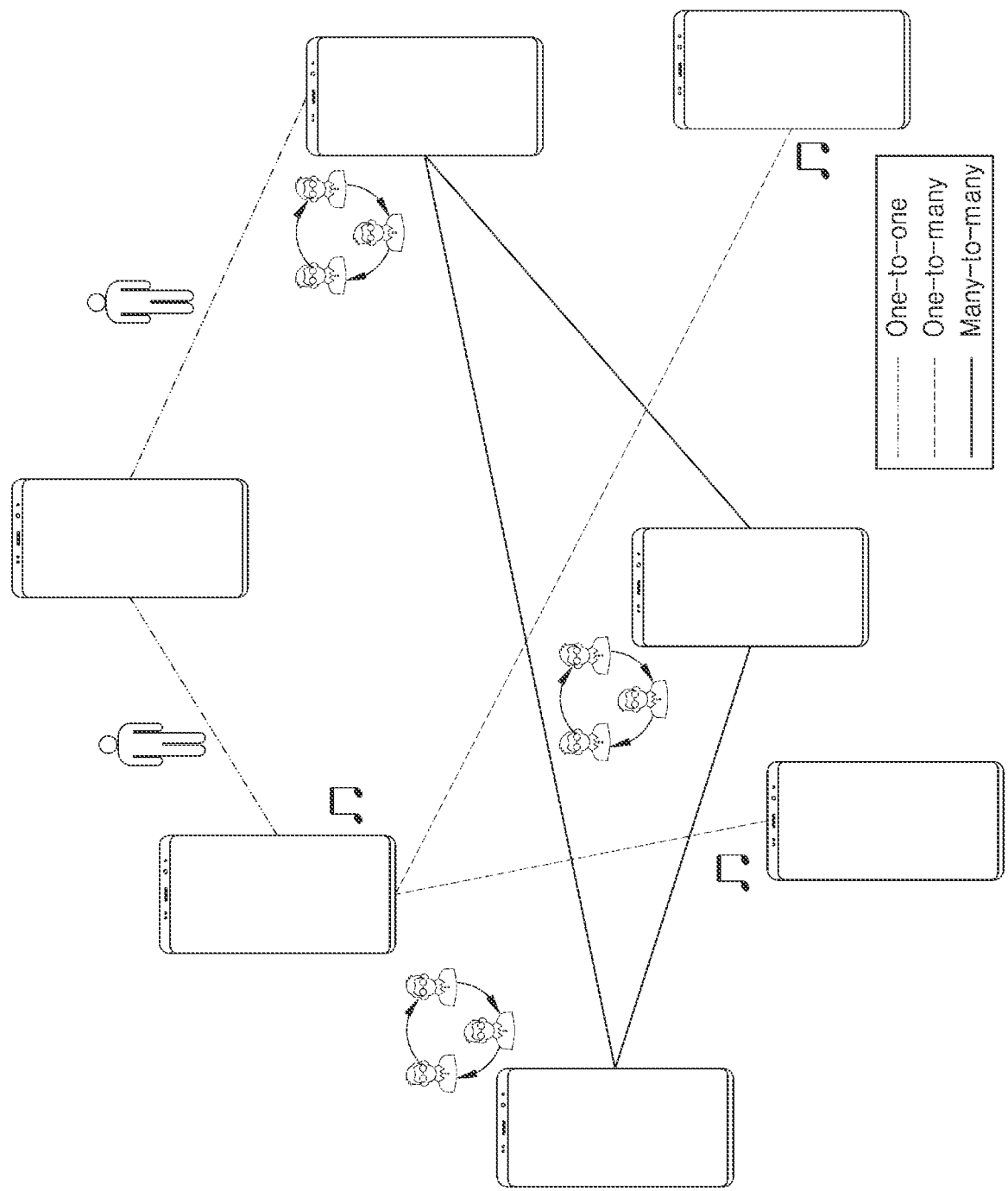
FIG. 1 is a diagram illustrating a general device-to-device (D2D) communication procedure.

According to an embodiment, a controller 100 for performing ranging by using UWB may include: a communicator; a memory; and at least one processor configured to control an operation of the controller 100 by executing a program stored in the memory, wherein the at least one processor is configured to control the communicator to transmit a first ranging control (RC) frame to a controlee 200 and to perform ranging with the controlee 200 for a number of ranging rounds determined based on the first ranging control frame, change at least one ranging parameter based on a change request received from the controlee 200, and control the communicator to transmit a second ranging control frame including the changed at least one ranging parameter.

According to an embodiment, a controlee 200 for performing ranging by using UWB may include: a communicator; a memory; and at least one processor configured to control an operation of the second electronic device by executing a program stored in the memory, wherein the at least one processor is configured to control the communicator to receive a first ranging control frame from a controller 100, perform ranging with the controller 100 for a number of ranging rounds determined based on the first ranging control frame, transmit a change request to the controller 100, and receive a second ranging control frame including at least one ranging parameter changed based on the change request frame.

Mode of Disclosure

Hereinafter, embodiments of the disclosure will be described in detail with reference to the accompanying drawings so that those of ordinary skill in the art may easily implement the embodiments of the disclosure. However, the present disclosure may be implemented in various different forms and should not be construed as being limited to the examples described herein. Also, portions irrelevant to the description of the present disclosure will be omitted in the drawings for a clear description of the present disclosure, and like reference numerals will denote like elements throughout the specification.

The terms used herein are those general terms currently widely used in the art in consideration of functions in regard to the present disclosure, but the terms may mean various other terms according to the intentions of those of ordinary skill in the art, precedents, or new technology in the art. Thus, the terms used herein should not be interpreted only by the names of the terms but should be interpreted based on the meanings of the terms and the contents throughout the present disclosure.

Although terms such as "first" and "second" may be used herein to describe various elements or components, these elements or components should not be limited by these terms. These terms are used to distinguish one element from another element.

Also, the terms used herein are merely for the purpose of describing particular embodiments of the disclosure and are not intended to limit the scope of the disclosure. As used herein, the singular forms "a", "an", and "the" are intended to include the plural forms as well, unless the context clearly indicates otherwise. Also, throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

As used throughout the specification, "the" or the like may refer to both the singular and the plural. Also, when there is no description explicitly specifying the order of operations described in a method according to the present disclosure, the described operations may be performed in a suitable order. The scope of the present disclosure is not limited to the described operation order.

Phrases such as "in an embodiment" appearing in various places in the specification do not necessarily all refer to the same embodiment.

An embodiment of the disclosure may be represented by functional block configurations and various processing operations. Some or all of these functional blocks may be implemented by any number of hardware and/or software components that execute particular functions. For example, the functional blocks of the disclosure may be implemented by one or more microprocessors or may be implemented by circuit configurations for a certain function. Also, for example, the functional blocks of the disclosure may be implemented in various programming or scripting languages. The functional blocks may be implemented as an algorithm executed in one or more processors. Also, the present disclosure may employ the related art for electronic environment setting, signal processing, and/or data processing.

Also, the connection lines or connection members between the components illustrated in the drawings are merely examples of functional connections and/or physical or logical connections. In an actual apparatus, the connections between components may be represented by various functional connections, physical connections, or logical connections that are replaceable or added.

In general, wireless sensor network technology may be largely divided into a wireless local area network (WLAN)

technology and a wireless personal area network (WPAN) technology according to the recognition distance. In this case, the WLAN is a technology based on IEEE 802.11 and is a technology allowing access to the backbone network within a radius of about 100 m. Also, the WPAN is a technology based on IEEE 802.15 and includes Bluetooth, ZigBee, ultra-wide band (UWB), or the like. A wireless network in which such wireless network technology is implemented may include a plurality of communication electronic devices. In this case, a plurality of communication electronic devices may perform communication in an active period by using a single channel. That is, the communication electronic devices may collect packets and transmit the collected packets in the active period.

The UWB may refer to a short-range high-speed wireless communication technology that uses a wide frequency band of several GHz or more, a low spectrum density, and a short pulse width (1 nsec to 4 nsec) in a baseband state. The UWB may refer to the band itself where UWB communication is applied. Hereinafter, a ranging method between electronic devices will be described based on a UWB communication method; however, this is merely an example, and various wireless communication technologies may be used in reality.

Electronic devices according to embodiments of the disclosure may include mobile terminals or fixed terminals implemented as computer devices and may communicate with other devices and/or servers by using wireless or wired communication methods. For example, the electronic devices may include smart phones, mobile terminals, laptop computers, digital broadcasting terminals, personal digital assistants (PDAs), portable multimedia players (PMPs), navigation devices, slate PCs, tablet PCs, digital TVs, desktop computers, refrigerators, projectors, vehicles, smart cars, printers, and the like, but are not limited thereto.

Hereinafter, the disclosure will be described in detail with reference to the accompanying drawings.

FIG. 1 is a diagram illustrating a general device-to-device (D2D) communication procedure.

D2D communication may refer to a method in which electronic devices that are geographically close to each other directly communicate without passing through an infrastructure such as a base station. As illustrated in FIG. 1, electronic devices may communicate in one-to-one, one-to-many, and many-to-many manners. The D2D communication may use an unlicensed frequency band like Wi-Fi Direct or Bluetooth. Alternatively, the D2D communication may improve the frequency use efficiency of a cellular system by using a licensed frequency band. D2D communication may be restrictively used as a term referring to communication between things or intelligent communication between things; however, the D2D communication in the disclosure may include not only communication between simple electronic devices with a communication function but also communication between various types of electronic devices with a communication function, such as smart phones or personal computers.

Figure 2:
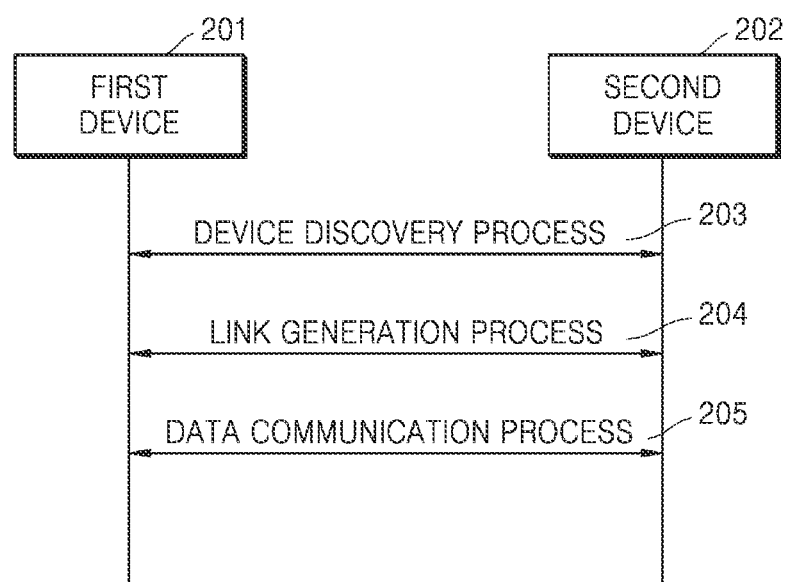
FIG. 2 is a diagram illustrating a communication process of a plurality of electronic devices.

FIG. 2 is a diagram illustrating a communication process of a plurality of electronic devices.

A first electronic device 201 and a second electronic device 202 may perform communication through a device discovery process 203, a link generation process 204, and a data communication process 205.

In the device discovery process 203, each of the first electronic device 201 and the second electronic device 202 may discover other electronic devices capable of D2D communication, among electronic devices around each of the first electronic device 201 and the second electronic device 202. Accordingly, each of the first electronic device 201 and the second electronic device 202 may determine whether to generate a link for D2D communication. For example, the first electronic device 201 may transmit a discovery signal such that the second electronic device 202 may discover the first electronic device 201. Also, the first electronic device 201 may receive a discovery signal transmitted by the second electronic device 202 to determine that other electronic devices capable of D2D communication are within the D2D communication range.

In the link generation process 204, each of the first electronic device 201 and the second electronic device 202 may generate a link for data transmission with an electronic device, to which data is to be transmitted, among electronic devices discovered in the device discovery process 203. For example, the first electronic device 201 may generate a link for data transmission with the second electronic device 202 discovered in the device discovery process 203.

In the data communication process 205, each of the first electronic device 201 and the second electronic device 202 may transmit/receive data to/from devices with which a link have been generated in the link generation process 204. For example, the first electronic device 201 may transmit/receive data to/from the second electronic device 202 through the link generated in the link generation process 204.

Various embodiments of the disclosure may relate to medium access control (MAC) based on the D2D communication described above, and the distance between electronic devices may need to be measured for medium access control. In this case, a UWB ranging technology may be used to measure the distance between electronic devices. For example, in the case of using a digital key stored in a smart phone to open/close a vehicle door, the vehicle may use a plurality of UWB communication modules (e.g., 6 UWB communication modules) to separately measure the distance between the smart phone and the vehicle and then estimate the position of the smart phone based on the measurement result. The vehicles and the smart phone may use multicast ranging or broadcast ranging.

Figure 3:
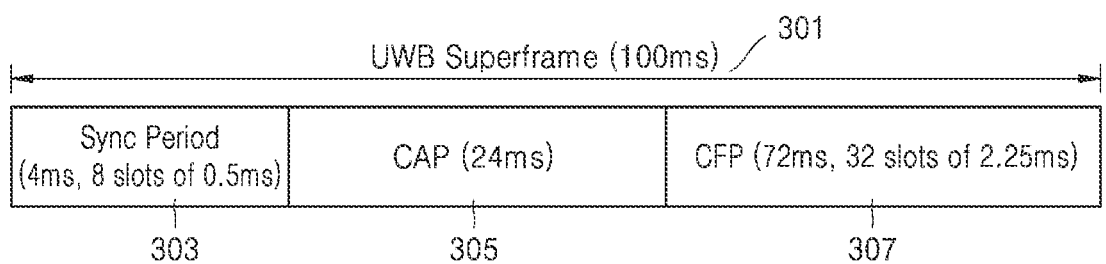
FIG. 3 illustrates a configuration of an ultra-wide band (UWB) superframe.

In the related art, a UWB superframe of a fixed length (e.g., 100 ms) may be used for UWB ranging. FIG. 3 illustrates a configuration of a UWB superframe.

In the related art, a device may activate UWB communication and then perform synchronization by receiving synchronization packets as many as a certain number of superframes.

As illustrated in FIG. 3, a superframe 301 may include a synchronized period 303, a contention access period (CAP) 305, and a contention-free period (CFP) 307.

In the related art, the device may schedule a slot of the contention-free period (CFP) 307 in the synchronized period 303 of the superframe 301 and use the scheduled slot. In using the CFP period for stable ranging, because the length of the CFP period may be fixed, only a small number of devices per superframe may be accommodated.

Figure 4:
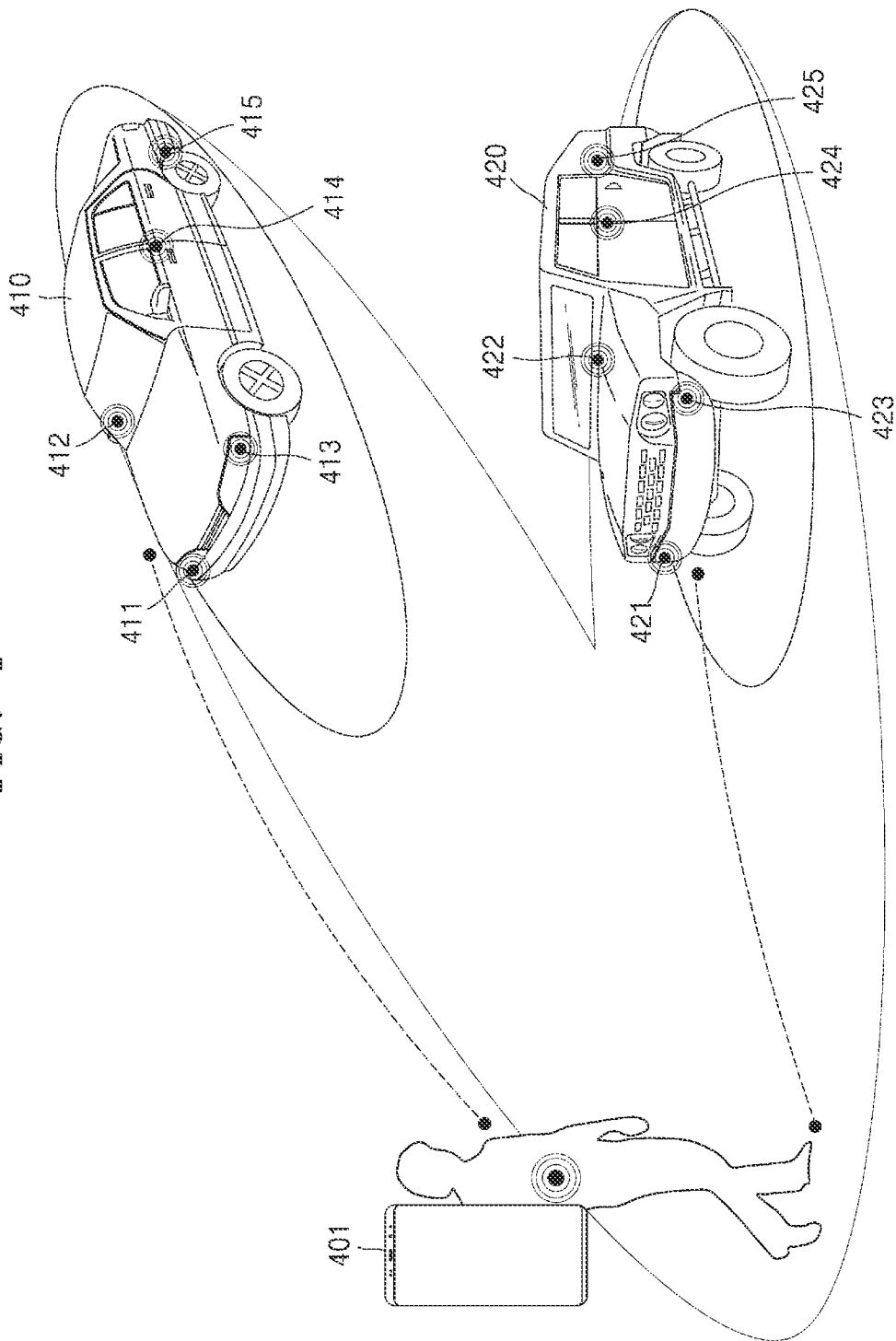
FIG. 4 is a diagram for describing the necessity of ranging with a plurality of vehicles.

For example, as illustrated in FIG. 4, when vehicles 410 and 420 each using five or more UWB communication modules 411, 412, 413, 414, and 415 or 421, 422, 423, 424, and 425 and a device 401 perform ranging, the device of the related art may accommodate only 1 to 2 vehicles per superframe.

Also, in the related art, it may be impossible to configure ranging of a certain period, such as performing first ranging at an interval of less than 100 ms and performing ranging at an interval of 250 ms.

Thus, in order to solve the problem of the related art, the present disclosure may propose a media access control (MAC) protocol for ranging with a plurality of devices.

A device according to various embodiments of the disclosure may perform ranging at dynamic time intervals according to the distances from other devices and may stably perform ranging with a plurality of other devices.

For example, as illustrated in FIG. 4, the device 401 according to an embodiment of the disclosure may perform multicast ranging with a first vehicle 410 and a second vehicle 420. In this case, as the device 401 according to an embodiment of the disclosure approaches at least one of the first vehicle 410 and the second vehicle 420, the device 401 may perform ranging at dynamic time intervals.

An electronic device according to an embodiment of the disclosure may perform ranging by using a ranging control frame. Two device types related to ranging control may be referred to as "controller 100" or "controlee 200".

First, the controller 100 may be defined as a device that defines and controls ranging parameters by transmitting a ranging control frame together with a ranging control IE. The ranging control frame may be used to set ranging parameters.

The controlee 200 may be defined as a device that uses ranging parameters received from the controller 100. At least one or more controlees 200 may be managed by the controller 100. A method of determining the function of a device (e.g., the function of a controller or the function of a controlee) and selecting the ranging parameters may be implemented in various ways.

Also, two device types for ranging control may be referred to as "initiator" or "responder". The initiator may be a device that initiates ranging by transmitting a poll. The responder may be a device that responds to a poll received from the initiator.

The controller 100 according to an embodiment of the disclosure may determine devices participating in ranging and device types by using a ranging initiator/responder list (IRL) IE or a ranging scheduling (RS) IE. The IRL IE and the RS IE may be carried by the ranging control frame. In the case of scheduling-based ranging, the RS IE may be configured by the controller 100 to indicate resource management and functions of devices (i.e., the function of an initiator or a responder). In the case of contention-based ranging, the IRL IE may be used to determine the functions of devices when not using the RS IE.

A schedule mode field of the ranging control IE may indicate whether the ranging frame is transmitted by using contention or by using schedule. Devices that are not specified by these IEs may not participate in ranging. When transmission of a poll frame by a device is required, the device type of the device may be determined as an initiator whereas a device responding to the poll frame may be determined as a responder.

In the case of contention-based multicast/broadcast ranging, when the controller 100 is the only initiator in ranging and a destination address field in a MAC header of the ranging control frame designates the responder, the controller may not add the IRL IE to the ranging control frame.

Because the ranging control frame includes the IRL IE or the RS IE, the controlee 200 may determine whether to transmit a poll by receiving the ranging control frame. When the device type of the controlee 200 is designated as an initiator in the IRL IE or the RS IE, the controlee 200 may transmit a poll frame. Both the controller 100 and the controlee 200 may be an initiator or a responder.

Figure 5:
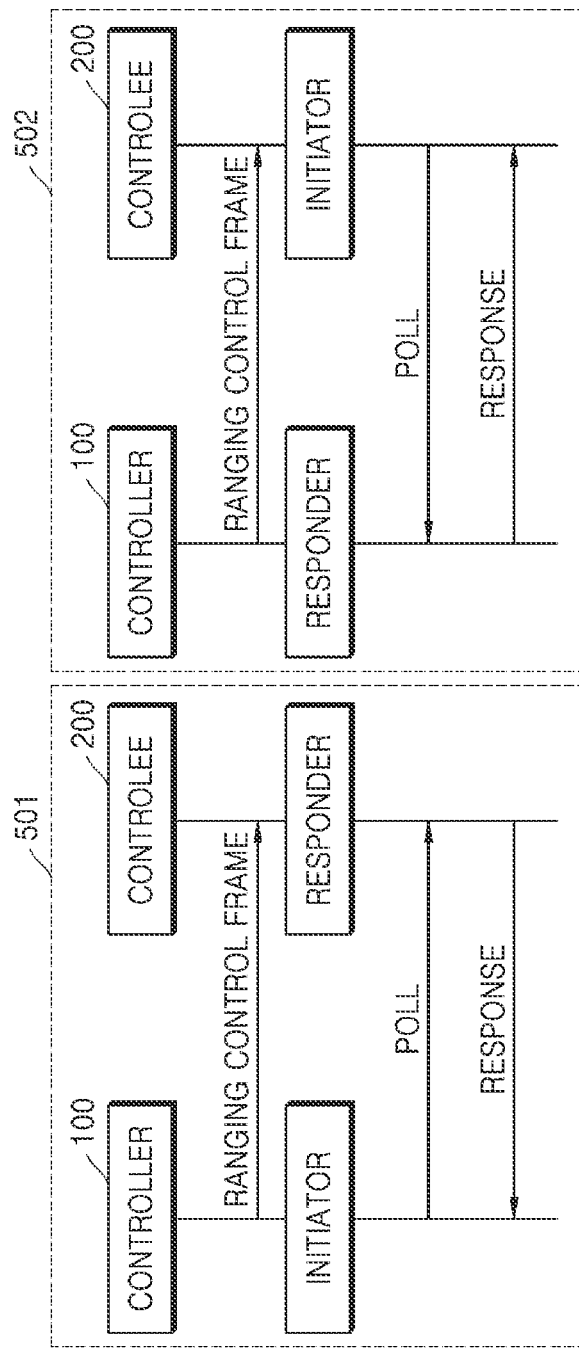
FIG. 5 illustrates a method of operating a UWB ranging system including a controller and a controlee.

FIG. 5 illustrates an example of single-sided two-way ranging (SS-TWR) using a ranging control frame. The SS-TWR may be one of various ranging methods introduced herein.

As illustrated in a flowchart 501 of FIG. 5, when the controller 100 sets the controller 100 to transmit a poll frame, the controller 100 may become an initiator and thus may transmit a poll frame. On the other hand, as illustrated in a flowchart 502 of FIG. 5, when the controller 100 sets the controlee 200 to transmit a poll frame, the controlee 200 may become an initiator and thus may transmit a poll frame.

Also, the ranging control frame may include a ranging acknowledgment IE indicating a ranging response type. A plurality of controlees may be used for multicast/broadcast/M2M ranging.

The device according to an embodiment of the disclosure may perform ranging in units of ranging blocks.

A ranging block may represent a virtual time frame for ranging. The ranging block may include multiple ranging rounds. A ranging round may indicate that all ranging events between ranging devices of a UWB network have been completed. The ranging round may include multiple ranging slots. A ranging slot may represent a virtual time unit for transmission of a ranging frame. Because the ranging block, the ranging round, and the ranging slot are virtual time-based, time-based synchronization may not be required.

Figure 6:
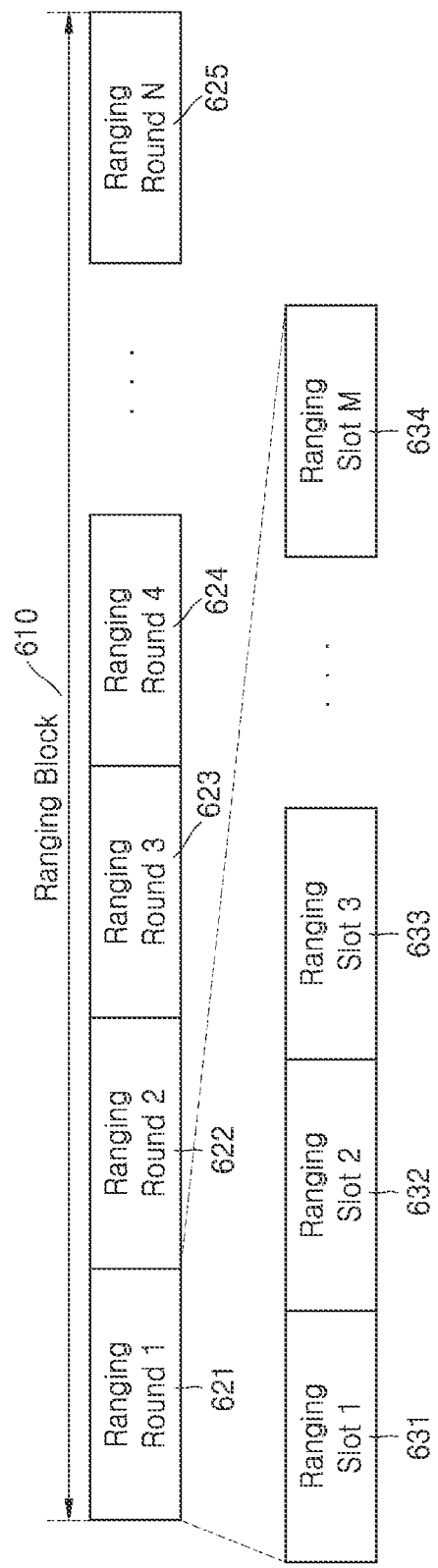
FIG. 6 illustrates a ranging block, ranging rounds, and ranging slots.

FIG. 6 illustrates a ranging block structure. As illustrated in FIG. 6, a ranging block 610 may include N ranging rounds 621, 622, 623, 624, and 625. The ranging round 621 may include M ranging slots 631, 632, 633, and 634.

A time unit (TU) may be defined as a minimum MAC time operation in a PHY unit. The ranging slot length may be defined as the integer number of TUs. The length of the ranging slot may be adjusted by a multiplier of the TU. The TU may be fixed at 250 μs that is an integer multiple of the reciprocal of a chipping rate of 499.2 MHz. The ranging round may be defined as the integer number of ranging slots. The length of the ranging round may be adjusted by a multiplier of the ranging slot. The ranging block length may be defined as an integer multiple of MinimumBlockLength. The ranging block length may be adjusted by a multiplier of MinimumBlockLength. MinimumBlockLength may be defined as the integer number of TUs.

Figure 7:
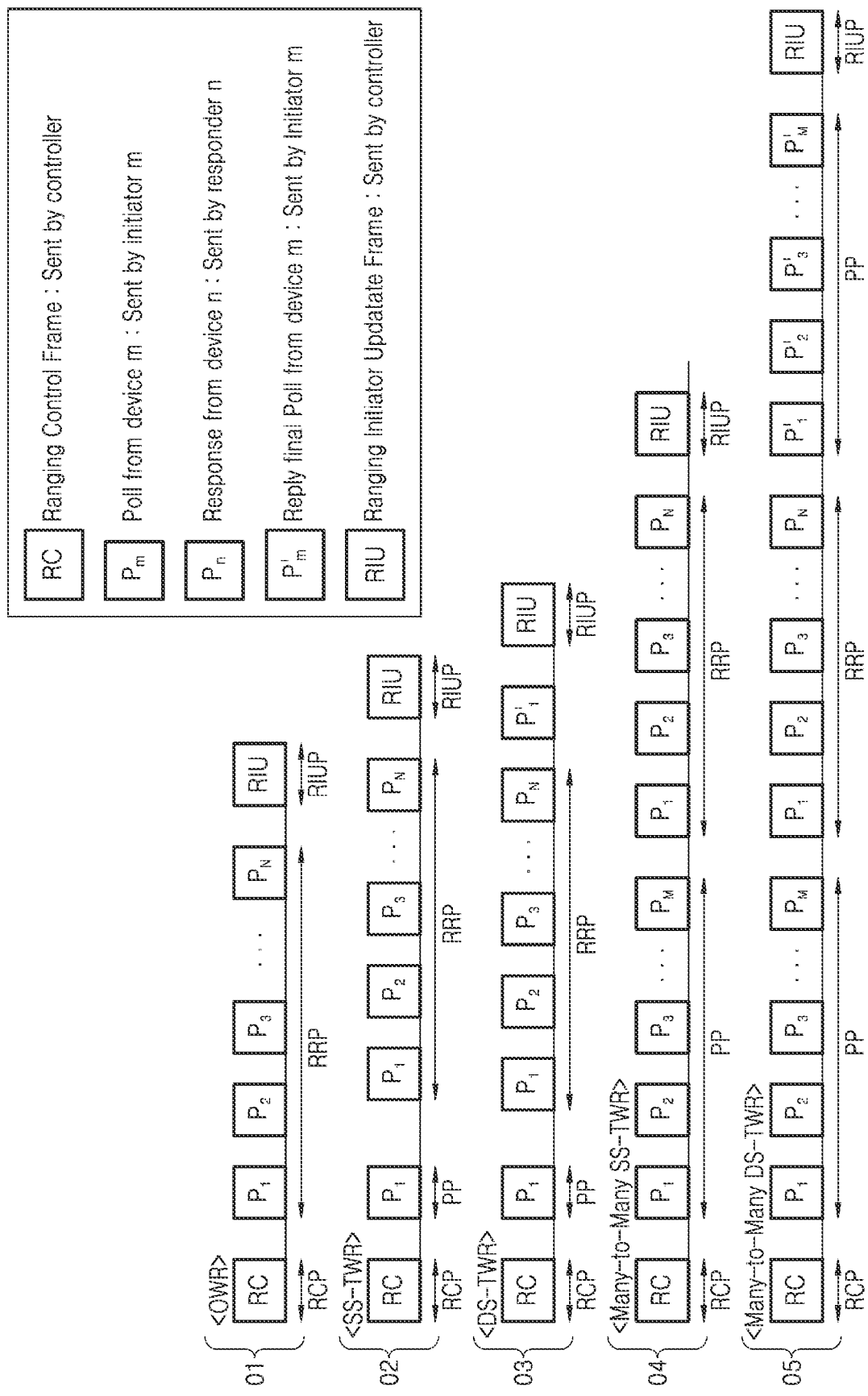
FIG. 7 illustrates timing diagrams illustrating examples of a ranging procedure.

FIG. 7 illustrates timing diagrams illustrating examples of a ranging procedure.

In a ranging round, one-way ranging (OWR), single-sided two-way ranging (SS-TWR) double-sided two-way ranging (DS-TWR), or the like may be used for ranging and localization. A ranging frame for OWR, SS-TWR, or DS-TWR may be transmitted in a ranging slot of the ranging round. The ranging round may include a ranging control period (RCP), one or more polling periods (PPs), one or more ranging response periods (RRPs), and a ranging interval update period (RIUP).

The RCP may be a period used by the controller to transmit a ranging control frame. The PP may be a period used by the initiator(s) to communicate with the responder(s). The RRP may be period used by the responder(s) to communicate with the initiator(s). The RIUP may be a period used by the controller to transmit a ranging interval update frame. When a Schedule Mode field value in the ranging control IE is 0 (i.e., in the case of a contention-based mode), a start slot index and an end slot index for each period may be designated in a ranging contention period IE. When the Schedule Mode field value in the ranging control IE is 1 (i.e., in the case of a schedule-based mode), information about slot allocation may be designated in the RS IE.

The ranging control frame may be transmitted when the first active ranging round(s) starts in the ranging block. Whether to transmit the ranging control frame in the next active ranging round(s) of the ranging block may be optional. When there is no ranging control frame in the next active ranging round(s), devices should follow the ranging configuration of the most recent ranging control frame.

The ranging interval update frame may be transmitted at the end of the active ranging round(s). The ranging interval update frame may be used to designate the updated start time of the next active ranging round(s).

FIG. 7 illustrates a timing diagram of five ranging procedure embodiments.

When the ranging control frame sets multicast and OWR, the ranging round may operate as in a first time diagram 01. When the ranging control frame sets multicast and SS-TWR, the ranging round may operate as in a second time diagram 02. When the ranging control frame sets multicast and DS-TWR, the ranging round may operate as in a third time diagram 03. When the ranging control frame sets Many-to-Many and SS-TWR, the ranging round may operate as in a fourth time diagram 04. When the ranging control frame sets Many-to-Many and DS-TWR, the ranging round may operate as in a fifth time diagram 05.

According to various embodiments of the disclosure, two types of ranging modes (e.g., an interval-based mode and a block-based mode) may be used for access control. The block-based mode may use a rigid time structure, but the interval mode may not. The controller 100 may select one of the modes and specify the corresponding mode by using a time structure indicator of the ranging control IE.

The interval-based mode according to an embodiment may use three intervals (e.g., a block interval, a round interval, and a ranging interval update (RIU) interval). The values of the intervals may be designated in the RIU IE.

The block interval may be used to designate the duration from the start time of the current frame including the RIU IE to the start time of the next ranging block for the device. The round interval may be used to designate the duration from the start time of the current frame including the RIU IE to the start time of the next ranging control frame for the device. The RIU interval may be used to designate the duration from the start time of the current frame including the RIU IE to the start time of the next RIU message. In this case, the next RIU message may deviate from the current ranging block.

In the interval mode, the ranging block may include multiple ranging rounds. In the interval mode, the active ranging round(s) may be defined as a ranging round where the ranging control frame is applied. The ranging control frame may be transmitted at the start of the first active ranging round(s). The ranging control frame may set all ranging parameters for the active ranging round(s). The number of active ranging rounds may be designated in a Number of Ranging Round field of the ranging control IE. In the interval mode, each ranging control frame transmitted in a ranging round may cover the following multiple active ranging rounds in a ranging block by using the value of a Number of Ranging Round (In the interval mode, each Ranging Control frame transmitted in a Ranging Round may cover the following multiple active ranging rounds in a Ranging Block by using the value of Number of Ranging Round). The ranging parameters of the active ranging round(s) may be determined by the controller 100. In the interval mode, an inactive ranging round in which there is no exchange of ranging frames may not be included in the ranging block.

The controller 100 may determine all the intervals and transmit the determined intervals to the controlee(s) 200 by using the ranging control frame carrying the RIU IE. Because the ranging control frame is transmitted in the first active ranging round(s) in the ranging block, the controlee(s) 200 may determine the start time of the next active ranging round(s) by receiving the ranging control frame. In order to save energy, a ranging device may sleep during the round interval.

After the ranging control frame is received, when the current ranging parameters or the current intervals need to be changed for the controlee 200, the controlee 200 may transmit a change request by adding a ranging change request (RCR) IE to a ranging frame. The RCR IE may be transmitted together with the ranging control IE, together with the ranging interval update IE, or together with the ranging control IE and the ranging interval update IE. The controller 100 may receive a change request from the controlee 200 together with the preference ranging parameters in the ranging control IE and the preference intervals in the ranging interval update IE.

When the controller 100 functions as an initiator, it may receive a change request from all the controlees 200. When the controller 100 functions as a responder, it may receive a change request from the controlee 200 functioning as an initiator. Receiving a change request from other controlees 208 functioning as a responder may be outside the scope of the disclosure and thus will be omitted for conciseness. After receiving the change request, the controller 180 may determine whether to accept the request. An RIU frame including updated intervals may be transmitted in a slot of an RIU period. The updated interval may designate the start time of an RC frame together with the updated ranging parameters and the updated intervals. The RC frame including the updated ranging parameters and the updated intervals may be transmitted in an RC period.

When it is necessary to change the current ranging parameter or the current intervals for the controller 100, the RIU frame including the updated intervals may be transmitted in the slot of the RIU period. The updated interval may designate the start time of the RC frame including the updated ranging parameters and the updated intervals. The RC frame including the updated ranging parameters and the updated intervals may be transmitted in the RC period.

Figure 8:
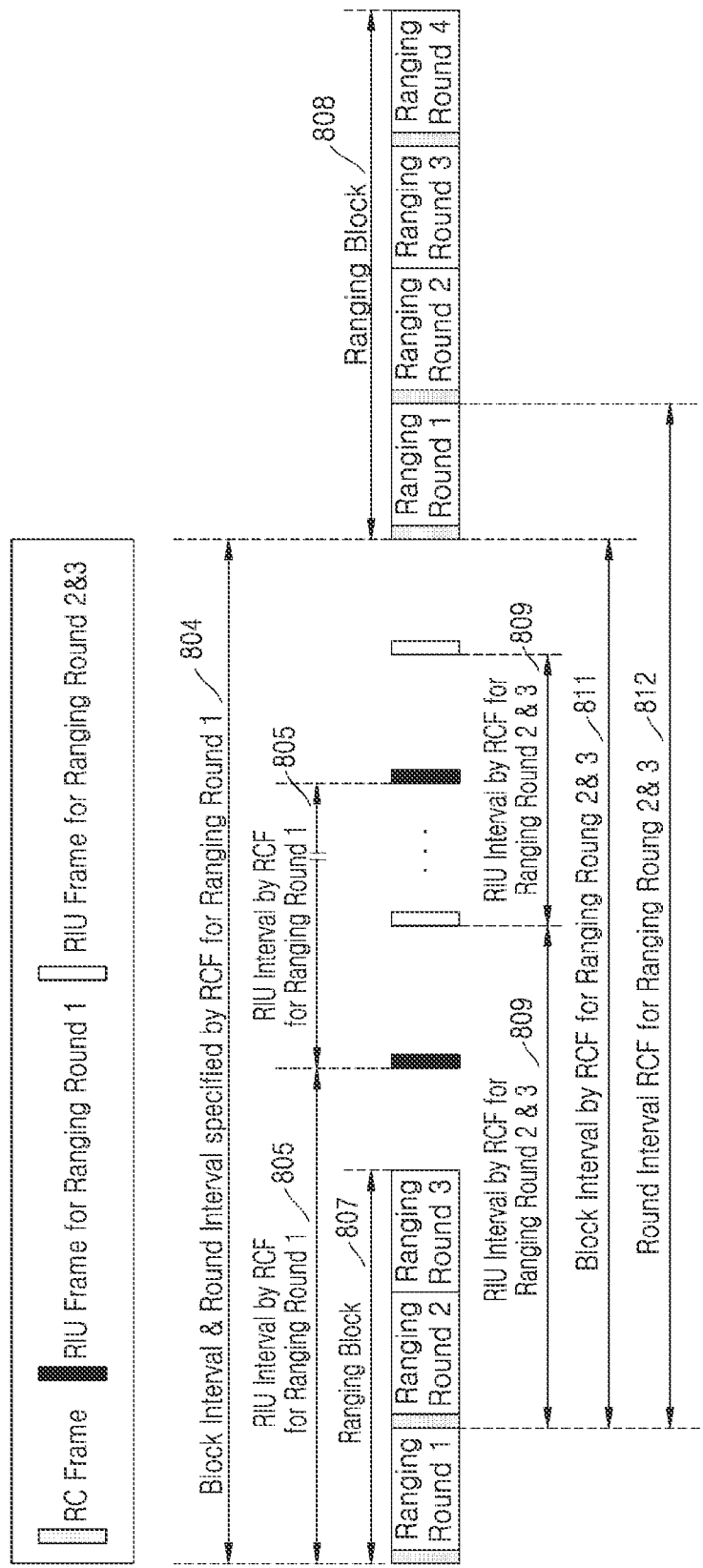
FIG. 8 illustrates an example of a timing diagram of an interval-based mode.

The RIU frame may be transmitted at the end of the active ranging round(s) as in FIG. 7. Also, as illustrated in FIG. 8, the RIU frame may be transmitted outside the ranging block. The RIU frame transmitted outside the ranging block may include the RIU IE. The RIU frame transmitted outside the ranging block may update the block interval and round interval values. Also, the Remaining Number of RIU Frame field value in the RIU IE may decrease until it becomes 0. When the Remaining Number of RIU Frame field value is 0, it may mean that no more RIU frames may be expected until the values of the RC frame and the RIU IE are updated and included in the next RC frame.

FIG. 8 illustrates an example of a time diagram of an interval-based mode.

There may be 3 ranging rounds in the first ranging block. In Ranging Round 1 of a first ranging block 807, the controller 100 may transmit a ranging control frame including a ranging control IE and a ranging interval update IE. Ranging devices may set ranging parameters by using the values of the fields of the ranging control IE. The value of the Number of Ranging Round field in the ranging control IE of Ranging Round 1 may be 1. Intervals may be set by using the values of the fields of the ranging interval update IE. Because the start time of the ranging block and the start time of the ranging control frame may be equal to each other, a block interval 804 and a round interval 804 for Ranging Round 1 may be equal to each other. The RIU frame of Ranging Round 1 may be transmitted at an RIU interval 805. For every RIU frame, the values of the block interval field, the round interval field, and the Remaining Number of RIU Frame field may be updated, but the RIU interval may be fixed.

Ranging Round 2 may include an own ranging control frame including a ranging interval update IE and a ranging control IE for Ranging Round 2 and Ranging Round 3 The value of the Number of Ranging Round field in the ranging control IE of Ranging Round 2 may be 2. Because the start time of the ranging block 807 and the start time of the ranging control frame may be different from each other, a block interval 811 and a round interval 812 for Ranging Round 2 may be different from each other. The RIU frame for Ranging Rounds 2 and 3 may be transmitted at an RIU interval 809.

The ranging control frames of the first ranging block 807 may include the same values for a Multiplier for Minimum Block Length field and a Minimum Block Length field. However, other parameters may be different from each other. For example, the controlee(s) may be different from each other between Ranging Round 1 and Ranging Round 2. Alternatively, the controlee(s) may be equal to each other between Ranging Round 2 and Ranging Round 3. As an example, the ranging parameters may be different from each other to support different ranging devices with different functions. As another example, the ranging parameters may be different even when the controlee(s) are equal between Round 1 and Round 2. The controller may determine all ranging parameters and intervals. Determination of the ranging parameters and intervals may vary according to embodiments.

A second ranging block 808 may include four ranging rounds. The controller 100 may set the ranging parameters and the interval by considering an additional ranging round before starting the second ranging block 808. The controller 100 may transmit updated values for the ranging control IE and the ranging interval update IE.

The ranging control IE may include a Multiplier for Minimum Block Length field and a Minimum Block Length field. The block length may be defined as the value obtained by multiplying the Minimum Block Length by the Multiplier for Minimum Block Length. The ranging control IE may include fields for Length of Ranging Round Length, Number of Ranging Rounds, and Length of Ranging Slot. When the ranging device successfully receives the ranging control frame, a block structure for ranging may be constructed by using the values of the fields.

When the controlee 200 fails to receive the ranging control frame and does not have data about the intervals, the controlee 200 may continue to listen to the channel to receive the ranging control frame.

When the controlee 200 fails to receive the ranging control frame or the RIU frame by using the value of updated intervals and has data about the previous intervals updated by the previous ranging control frame, the controlee 200 may be awakened by using the previous round interval. When the updated round interval is shorter than the previous round interval, the controller 100 may wake up at the updated round intervals. Because there is no poll or response from the controlee 200, the controller 100 may determine that the controlee 100 fails to receive the updated round interval and wakes up at the previous round intervals. When the updated round interval is longer than the previous round interval, the controlee 200 may wake up at the previous round intervals. When there is no ranging control frame, the controlee 200 may continue to listen to the channel to receive the ranging control frame. After the controller 100 wakes up at the updated round intervals, the controller 100 may transmit a ranging control frame and the controlee 200 may receive the ranging control frame.

Hereinafter, an operation method of each of the controller 100 and the controlee 200 according to an embodiment will be described in detail. When ranging is performed between two electronic devices, one of the two electronic devices may be a controller and the other may be a controlee. Thus, the controller may be referred to as a first electronic device, and the controlee may be referred to as a second electronic device.

Figure 9:
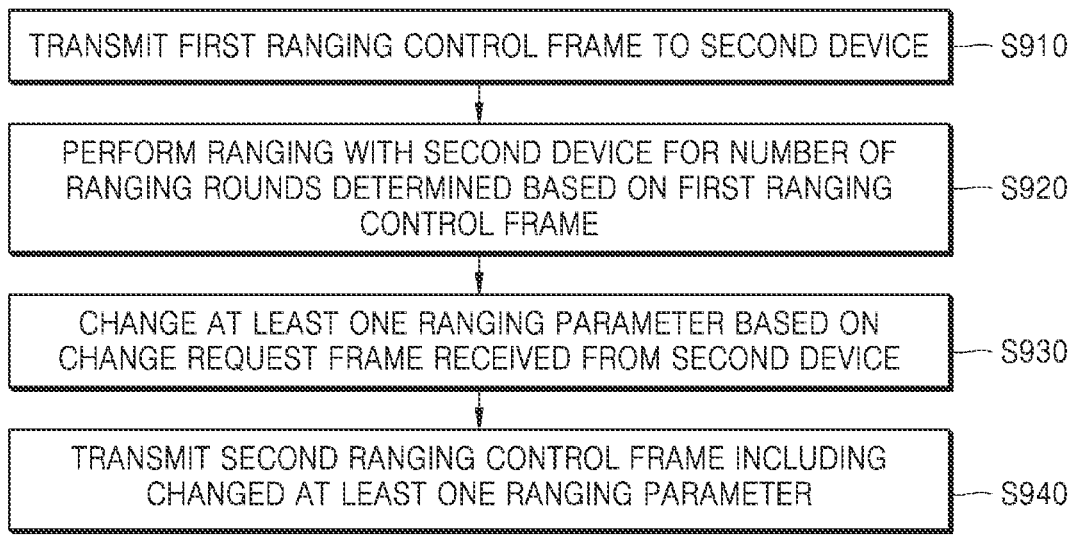
FIG. 9 illustrates a flowchart of a method of operating a controller 100 according to an embodiment.

FIG. 9 illustrates a flowchart of a method of operating a controller 100 according to an embodiment.

In operation S910, the controller 100 according to an embodiment may transmit a first ranging control (RC) frame to the controlee 200.

When the controller 100 and the controlee 200 according to an embodiment perform ranging in an interval mode, an active ranging round may be defined as a ranging round where a ranging control frame is applied. The ranging control frame may be transmitted at the start of the first active ranging round. The ranging control frame may set all ranging parameters for the active ranging round.

The first ranging control frame according to an embodiment may include information about ranging parameters and information about ranging intervals. For example, the information about ranging parameters may include a ranging control IE, and the information about ranging intervals may include an RIU IE. The content field format of the RC IE will be described below in more detail with reference to FIG. 10. The content field format of the RIU IE will be described below in more detail with reference to FIG. 12.

For example, the information about ranging intervals may include information about at least one of a block interval, a round interval, a ranging interval update (RIU) interval, and the number of RIU frames remaining until transmission of the next ranging control frame.

The first ranging control frame may further include information about at least one of Multiplier for Minimum Block Length, Minimum Block Length, Number of Ranging Rounds, Ranging Round Length, and Ranging Slot Length. The first ranging control frame may further include the number of ranging rounds where the first ranging control frame is applied.

In operation S920, the controller 100 according to an embodiment may perform ranging with the controlee 200 for a number of ranging rounds determined based on the first ranging control frame.

In the interval mode, a ranging block may include multiple ranging rounds. In this case, the number of active ranging rounds may be designated in a Number of Ranging Round field of a ranging control IE of a ranging control frame.

In the interval mode, each ranging control frame transmitted in a certain ranging round may be applied to the following multiple active ranging rounds in the ranging block by using a Number of Ranging Round field value.

As an example, the function of the controller 100 according to an embodiment may be an initiator of ranging. In this case, the controller 100 may transmit a poll frame for initiating ranging to the controlee 200 and receive a response frame from the controlee 200.

As another example, the function of the controller 100 according to an embodiment may be a responder of ranging. In this case, the controller 100 may receive a poll frame for initiating ranging from the controlee 200 and transmit a response frame to the controlee 200.

The controller 100 according to an embodiment may perform ranging during each ranging round according to the procedure illustrated in FIG. 7. The controller 100 according to an embodiment may receive a ranging frame including change request information from the controlee 200 while performing ranging.

When the current ranging parameters or the current intervals need to be changed, the controlee 200 according to an embodiment may transmit a change request by adding a ranging change request (RCR) IE to a ranging frame. The RCR IE may be transmitted together with the ranging control IE, together with the ranging interval update IE, or together with the ranging control IE and the ranging interval update IE. The controller 100 may receive a change request from the controlee 200 together with the preference ranging parameters in the ranging control IE and the preference intervals in the ranging interval update IE.

In operation S930, the controller 100 according to an embodiment may change at least one ranging parameter based on the change request received from the controlee 200. In operation S940, the controller 100 according to an embodiment may transmit a second ranging control frame including the changed at least one ranging parameter.

The controller 100 according to an embodiment may identify at least one of information about a preference parameter and information about a preference interval, which are included in the change request information. The controller 100 may change at least one ranging parameter based on at least one of the information about a preference parameter and the information about a preference interval. The controller 100 may transmit information about the changed ranging parameter to the controlee 200.

The controller 100 according to an embodiment may transmit updated interval information through a frame in the ranging round, transmit updated interval information through a frame between the ranging blocks, or transmit updated interval information through a ranging control frame of the next ranging round.

As an example, the controller 100 may transmit updated interval information through a frame in the ranging round. The controller 100 may update the ranging interval based on the change request information received from the controlee 200. The controller 100 may transmit a frame including information about the updated ranging interval at the end of the ranging round. In this case, operations S920 and S930 of FIG. 9 may be performed within one ranging round. Also, in this case, in operation S940, the second ranging control frame may be transmitted at the time determined based on the updated ranging interval.

As another example, the controller 100 may transmit updated interval information through a frame between the ranging blocks. The controller 100 may update the ranging interval based on the change request information received from the controlee 200. The controller 100 may transmit a frame including information about the updated ranging interval, between the end point of the current ranging block and the start point of the next ranging block. In this case, in operation S940, the second ranging control frame may be transmitted at the time determined based on the updated ranging interval.

As another example, the controller 100 may transmit updated interval information through a ranging control frame of the next ranging round. The controller 100 may update the ranging interval based on the change request information received from the controlee 200. The controller 100 may reflect the change request received from the controlee 200 in the next ranging round and transmit the same through the ranging control frame.

FIG. 10 illustrates a content field format of a ranging control information element (IE) according to an embodiment.

As illustrated in FIG. 10, the controller 100 may use a ranging control (RC) IE to transmit ranging configuration information to the controlee 200 (in the case of the unicast mode) or to the controlees 200 (in the case of the multicast/broadcast mode).

Cast Mode of the RC IE of FIG. 10 may indicate whether the transmission mode is Unicast (00), Multicast (01), Broadcast (10), or Many-to-Many (11).

Ranging Mode may represent a ranging frame type and a ranging method used in the next ranging round(s) as illustrated in FIG. 11.

Schedule Mode may indicate whether ranging used in the next ranging rounds is contention-based (0) or scheduling-based (1). When the Schedule Mode field value is 0, the Ranging Initiator/Responder List IE and the Ranging Contention Period IE may be called. When the Schedule Mode field value is 1, the Ranging Scheduling IE may be called. Schedule Mode may be applied when Cast Mode is 00, 01, and 11.

Deferred Mode may indicate whether a deferred frame is not required (0) or required (1) in the next ranging rounds.

Time Structure Indicator may indicate whether ranging used in the next ranging rounds is an interval-based mode (0) for calling the Ranging Interval Update IE or a block-based mode (1) for calling the Ranging Interval Update IE, the Ranging Round Start IE, the Next Ranging Round IE, and the Ranging Block Update IE.

Multiplier for Minimum Block Length may represent a multiplier of Minimum Block for calculating the length of a ranging block.

Number of Ranging Rounds may designate the number of active ranging rounds managed by the Ranging Control IE in the interval-based mode.

Minimum Block Length may designate the length (duration) of the minimum length of a ranging block.

Length of Ranging Slot may designate the length (duration) of each ranging slot.

FIG. 12 illustrates a content field format of a ranging interval update information element (RIU IE) according to an embodiment. The RIU IE may be used to update the ranging interval in the interval-based mode.

Block Interval may designate the duration from the start time of the current frame including the RIU IE to the start time of the next ranging block for the device. Because the field value of Block Interval is represented as a multiplier of the TU, the block interval of a time scale may be the product of the field value of Block Interval and the TU.

Round Interval may designate the duration from the start time of the current frame including the RIU IE to the start time of the next RCF for the device. Because the field value of the round interval is represented as a multiplier of the TU, the round interval of a time scale may be the product of the field value of the round interval and the TU.

RIU Interval may designate the duration from the start time of the current frame including the RIU IE to the start time of the next RIU message, and the next RIU message may deviate from the current ranging block. Because the field value of RIU interval is represented as a multiplier of the TU, the RIU interval of a time scale may be the product of the field value of RIU Interval and the TU.

Remaining Number of RIU Frames may designate the number of RIU frames remaining until the next ranging control frame.

Moreover, a ranging change request IE (RCR IE) may be used as a portion of the ranging exchange for requesting the change of ranging parameters from the controller.

In the interval-based mode, the Ranging Change Request IE may be transmitted together with the Ranging Control IE, together with the Ranging Interval Update IE, or together with the Ranging Control IE and the Ranging Interval Update IE. In the block-based mode, the Ranging Change Request IE may be transmitted together with the Next Ranging Round (NNR) IE or the Ranging Block Update IE. Because the preference parameters and intervals from the controlee(s) may be included in the RC IE and the RIU IE, the RCR IE may have a content field of length 0.

Figure 13:
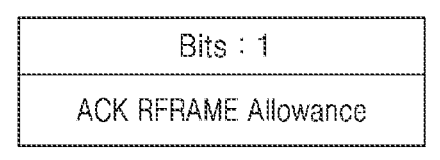

FIG. 13 illustrates a content field format of a ranging acknowledgment information element (RA IE) according to an embodiment.

When a ranging control frame is used in unicast ranging, the RA IE may be used as a portion of the ranging exchange to determine whether to use ACK RFRAME. When the ACK RFRAME Allowance field value is 1, ACK RFRAME may be allowed for unicast ranging, and otherwise, ACK RFRAME may not be allowed.

Figure 14:
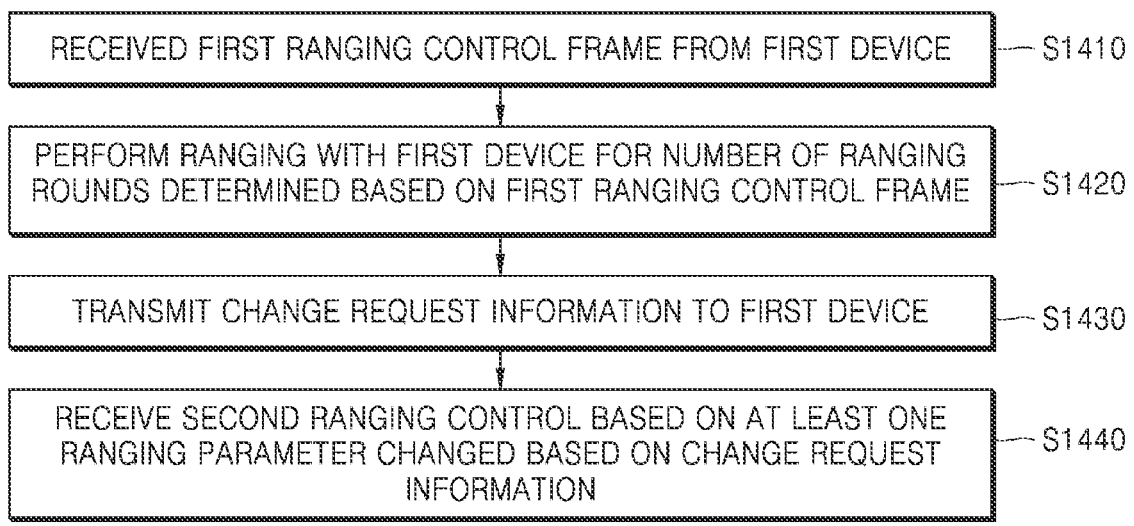
FIG. 14 illustrates a flowchart of a method of operating a controlee 200 according to an embodiment.

FIG. 14 illustrates a flowchart of a method of operating a controlee 200 according to an embodiment.

In operation S1410, the controlee 200 according to an embodiment may receive a first ranging control frame from the controller 100.

The first ranging control frame may include information about ranging parameters and information about ranging intervals. For example, the information about ranging parameters may include a ranging control IE, and the information about ranging intervals may include an RIU IE. The content field format of the RC IE has been described above with reference to FIG. 10. The content field format of the RIU IE has been described above with reference to FIG. 12. Thus, redundant descriptions thereof will be omitted for conciseness.

For example, the information about ranging intervals may include information about at least one of a block interval, a round interval, a ranging interval update (RIU) interval, and the number of RIU frames remaining until transmission of the next ranging control frame.

The first ranging control frame may further include information about at least one of Multiplier for Minimum Block Length, Minimum Block Length, Number of Ranging Rounds, Ranging Round Length, and Ranging Slot Length. The first ranging control frame may further include the number of ranging rounds where the first ranging control frame is applied.

In operation S1420, the controlee 200 according to an embodiment may perform ranging with the controller 100 for a number of ranging rounds determined based on the first ranging control frame.

In the interval mode, a ranging block may include multiple ranging rounds. In this case, the number of active ranging rounds may be designated in a Number of Ranging Round field of a ranging control IE of a ranging control frame.

In the interval mode, each ranging control frame transmitted in a certain ranging round may be applied to the following multiple active ranging rounds in the ranging block by using a Number of Ranging Round field value.

As an example, the function of the controlee 200 according to an embodiment may be an initiator of ranging. In this case, the controlee 200 may transmit a poll frame for initiating ranging to the controller 100 and receive a response frame from the controller 100.

As another example, the function of the controlee 200 according to an embodiment may be a responder of ranging. In this case, the controlee 200 may receive a poll frame for initiating ranging from the controller 100 and transmit a response frame to the controller 100.

The controller 100 according to an embodiment may perform ranging during each ranging round according to the procedure illustrated in FIG. 7.

In operation 31430, the controlee 200 according to an embodiment may transmit change request information to the controller 100. The controlee 200 according to an embodiment may transmit a ranging frame including change request information to the controller 100 while performing ranging.

When the current ranging parameters or the current intervals need to be changed, the controlee 200 according to an embodiment may transmit a change request by adding a ranging change request (RCR) IE to a ranging frame. The RCR IE may be transmitted together with the ranging control IE, together with the ranging interval update IE, or together with the ranging control IE and the ranging interval update IE. The controlee 200 may transmit a change request to the controller 100 together with the preference ranging parameters in the ranging control IE and the preference intervals in the ranging interval update IE.

In operation S1440, the controlee 200 according to an embodiment may receive a second ranging control frame based on at least one ranging parameter changed based on the change request information.

The controller 100 may change at least one ranging parameter based on the received change request information. The controlee 200 may receive information about the changed ranging parameter from the controller 100.

The controlee 200 according to an embodiment may receive updated interval information through a frame in the ranging round, receive updated interval information through a frame between the ranging blocks, or receive updated interval information through a ranging control frame of the next ranging round.

As an example, the controlee 200 may receive updated interval information through a frame in the ranging round. The controlee 200 may receive a frame including information about the updated ranging interval at the end of the ranging round with the controller 100. In this case, in operation S1440, the second ranging control frame may be received at the time determined based on the updated ranging interval.

As another example, the controlee 200 may receive updated interval information through a frame between the ranging blocks. The controlee 200 may receive a frame including information about the updated ranging interval, between the end point of the current ranging block and the start point of the next ranging block. In this case, in operation S1440, the second ranging control frame may be received at the time determined based on the updated ranging interval.

As another example, the controlee 200 may receive updated interval information through a ranging control frame of the next ranging round. In this case, in operation S1440, the controlee 200 may receive the second ranging control frame including information about the updated ranging interval based on the change request information in the next ranging round.

Hereinafter, a multicast/broadcast ranging procedure with a data response will be described with reference to FIGS. 15 to 19. A unicast ranging procedure may be considered as a special multicast case with one responder.

Figure 15:
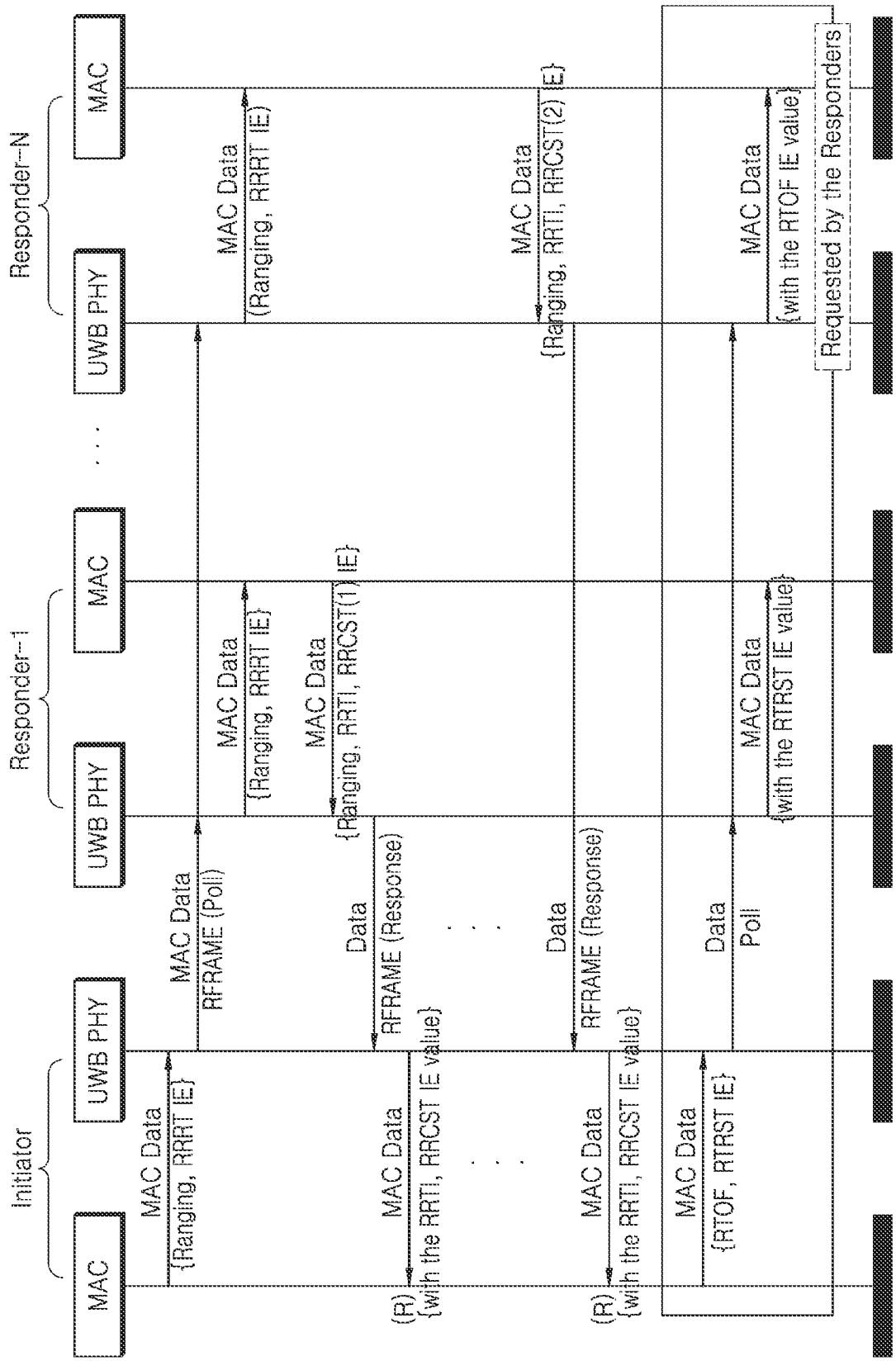
FIG. 15 illustrates an example of a message flowchart of multicast/broadcast single-sided two-way ranging (SS-TWR) according to an embodiment.

FIG. 15 illustrates an example of a message flowchart of multicast/broadcast single-sided two-way ranging (SS-TWR) according to an embodiment.

In the case of multicast/broadcast SS-TWR, a ranging exchange may be initiated by the initiator, and MAC data including a Ranging Request Reply Time IE (RRRT IE) may be included in the first ranging frame (i.e., a poll frame). A destination address may be a broadcast address in a broadcast ranging mode or a multicast address of a device group in a multicast ranging mode. Upon receiving a poll message, the responder may form a response frame including an SS-TWR control IE (i.e., a Ranging Report Control Single-sided TWR (RRCST) IE) and a Ranging Reply Time Instantaneous IE (RRTI IE) including a response time stamp. Because the RRCST IE is carried in the response frame, the initiator may determine whether it is necessary to retransmit the TX-to-RX round-trip time (RTRST) IE/Ranging Time-of-Flight (RTOF) IE/AOA estimation.

In the case of scheduling-based multicast ranging, the responder may transmit response frames in the allocated virtual time slots respectively. On the other hand, in the case of contention-based multicast/broadcast ranging, the responder may contend for virtual time slots in a ranging response period. After obtaining the ranging response frames, the initiator may have all information for calculating the propagation time for each of other initiator-responder pairs.

FIG. 15 illustrates a message flowchart for multicast/broadcast SS-TWR between one initiator and N responders (i.e., Responder-1, Responder-2, . . . , Responder-N). Here, response frames from other responders may be scheduled to be sequentially transmitted. At the point indicated by (R), the initiator may have sufficient information for calculating the ranging result of the corresponding pair. Different responders may respectively request different ranging results. For example, in FIG. 15, Responder-1 may request the TX-to-RX round-trip time (i.e., the value of the RRCST IE is 1), and Responder-N may directly request the ranging result (i.e., the value of the RRCST IE is 2). In the last poll, the RTRST IE and the RTOF IE may be distinguished by device IDs (i.e., MAC addresses) in the content field, which are dedicated to Responder-1 and Responder-N, respectively.

Moreover, FIGS. 16 to 19 illustrate examples of a message flowchart of multicast/broadcast Double-Sided Two-Way Ranging (DS-TWR) according to an embodiment.

In the case of multicast/broadcast DS-TWR, a three-way ranging method may be considered in order to reduce the number of transmissions of a ranging frame. A ranging exchange may be initiated by the initiator, and MAC data with a DS-TWR control IE (i.e., a Ranging Report Control Double-sided TWR (RRCDT) IE) may be included in the first poll message and transmitted to multiple responders. Upon receiving the poll, the responder may form a response frame including an RRRT IE for requesting the second response time of the initiator and an RRCDT IE having a value of 3 for requesting the second round-trip measurement. As in the multicast/broadcast SS-TWR, response frames of different responders may be sequentially scheduled or may contend for virtual time slots in the ranging response period. Also, the initiator may form a final poll integrating the IEs of the RRTI and RRTM respectively to different responders.

Figure 16:
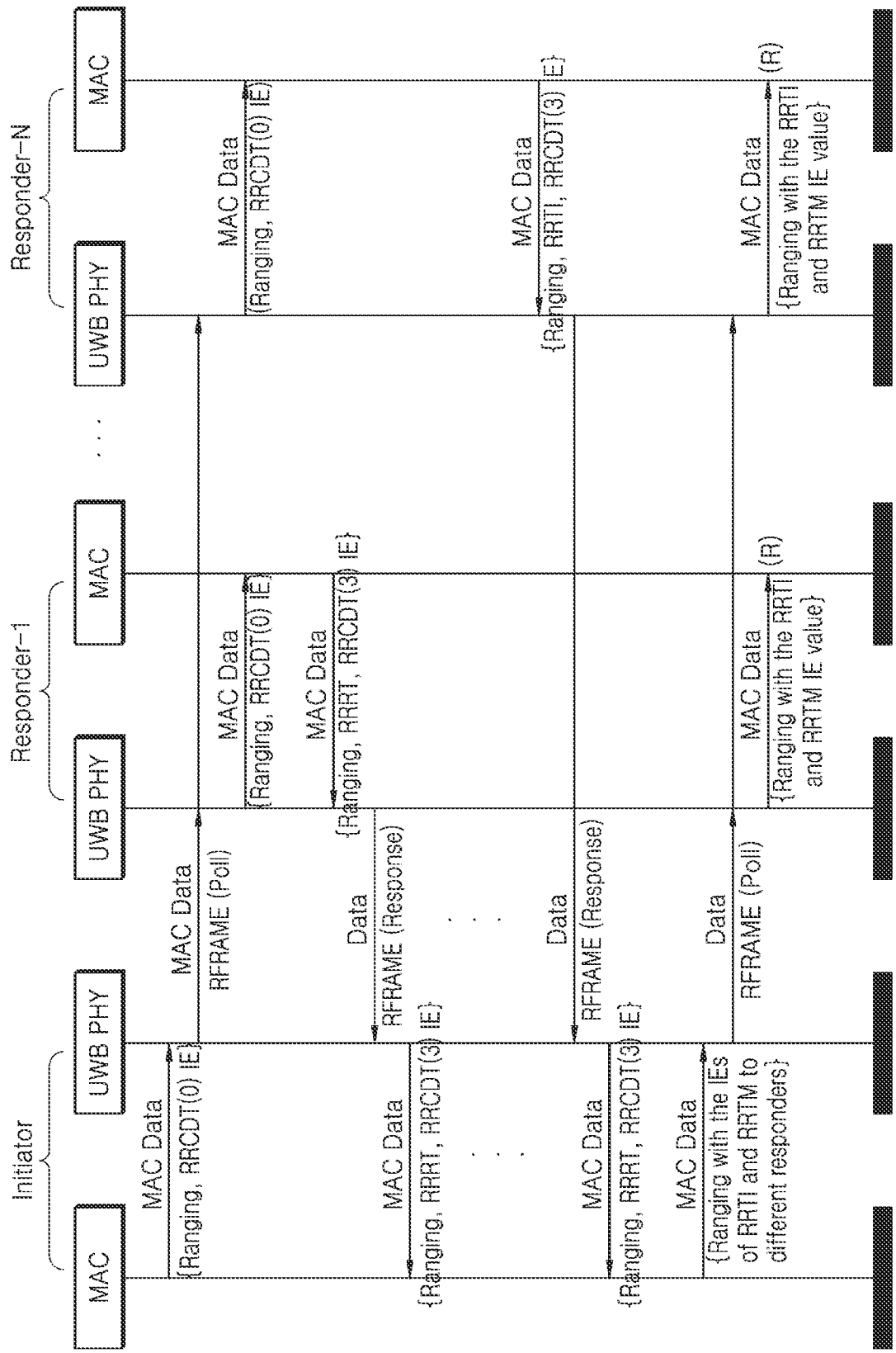
FIG. 16 illustrates an example of a message flowchart of multicast/broadcast double-sided two-way ranging (DS-TWR) according to an embodiment.

FIG. 16 illustrates a message flowchart for multicast/broadcast DS-TWR between one initiator and N responders (i.e., Responder-1, Responder-2, . . . , Responder-N). Here, response frames from other responders may be scheduled to be sequentially transmitted. At the point indicated by (R), each of the responders may have sufficient information for calculating the ranging result. In FIG. 16, because the value of the RRCDT IE in the first poll message is 0, the responder may not retransmit the ranging result to the initiator or may not retransmit the related time stamp for calculating the ranging result of the initiator to the initiator.

Figure 17:
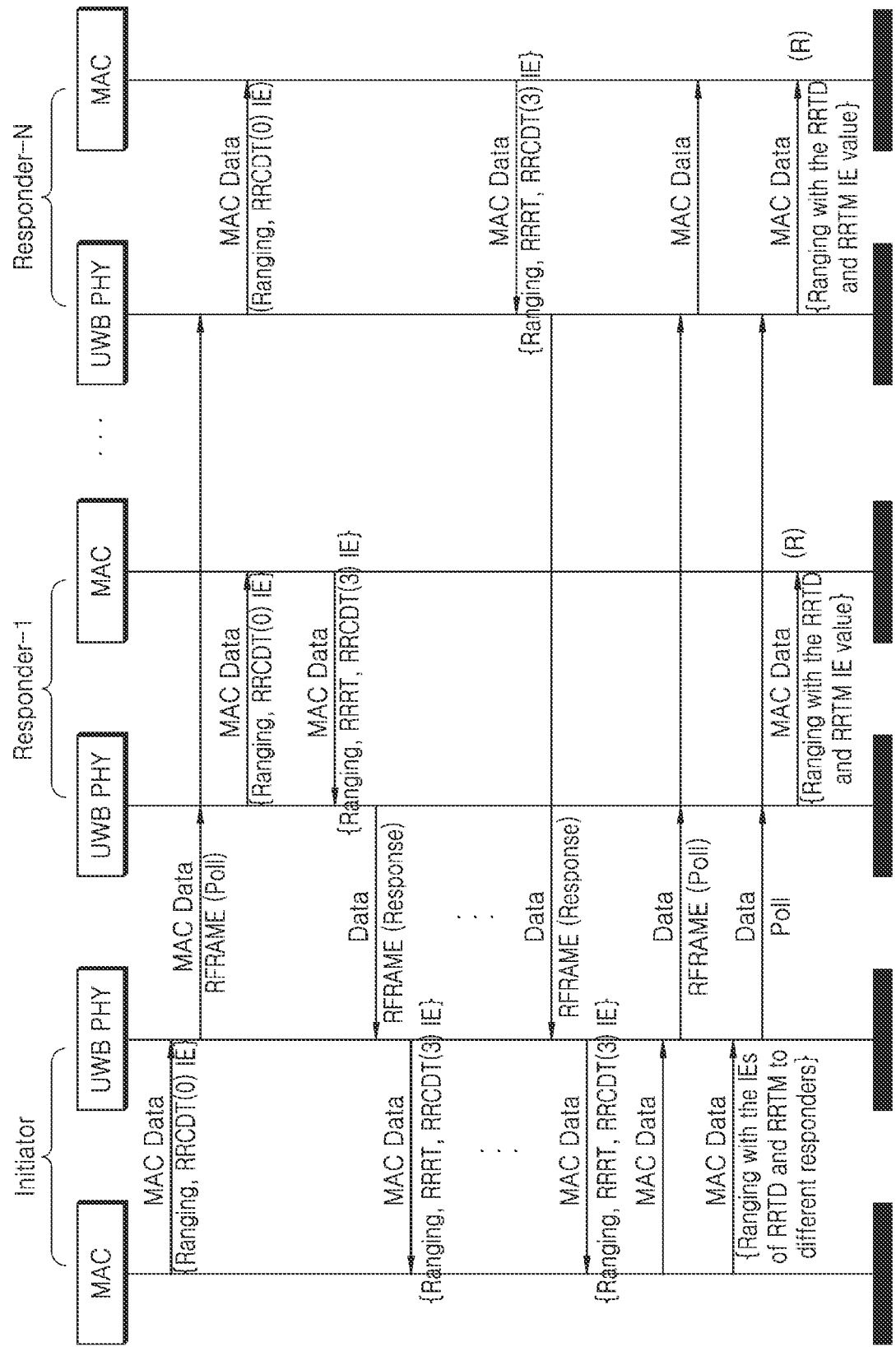
FIG. 17 illustrates an example of a message flowchart of multicast/broadcast double-sided two-way ranging (DS-TWR) according to an embodiment.

FIG. 17 illustrates a message flowchart for multicast/broadcast DS-TWR when a deferred mode is set in a ranging control IE. In the deferred mode, the initiator may transmit the first round time (Ranging Round Trip Measurement (RRTM) IE) and the second reply time (Ranging Reply Time Deferred (RRTD) IE) to the responders in separate data frames.

Figure 18:
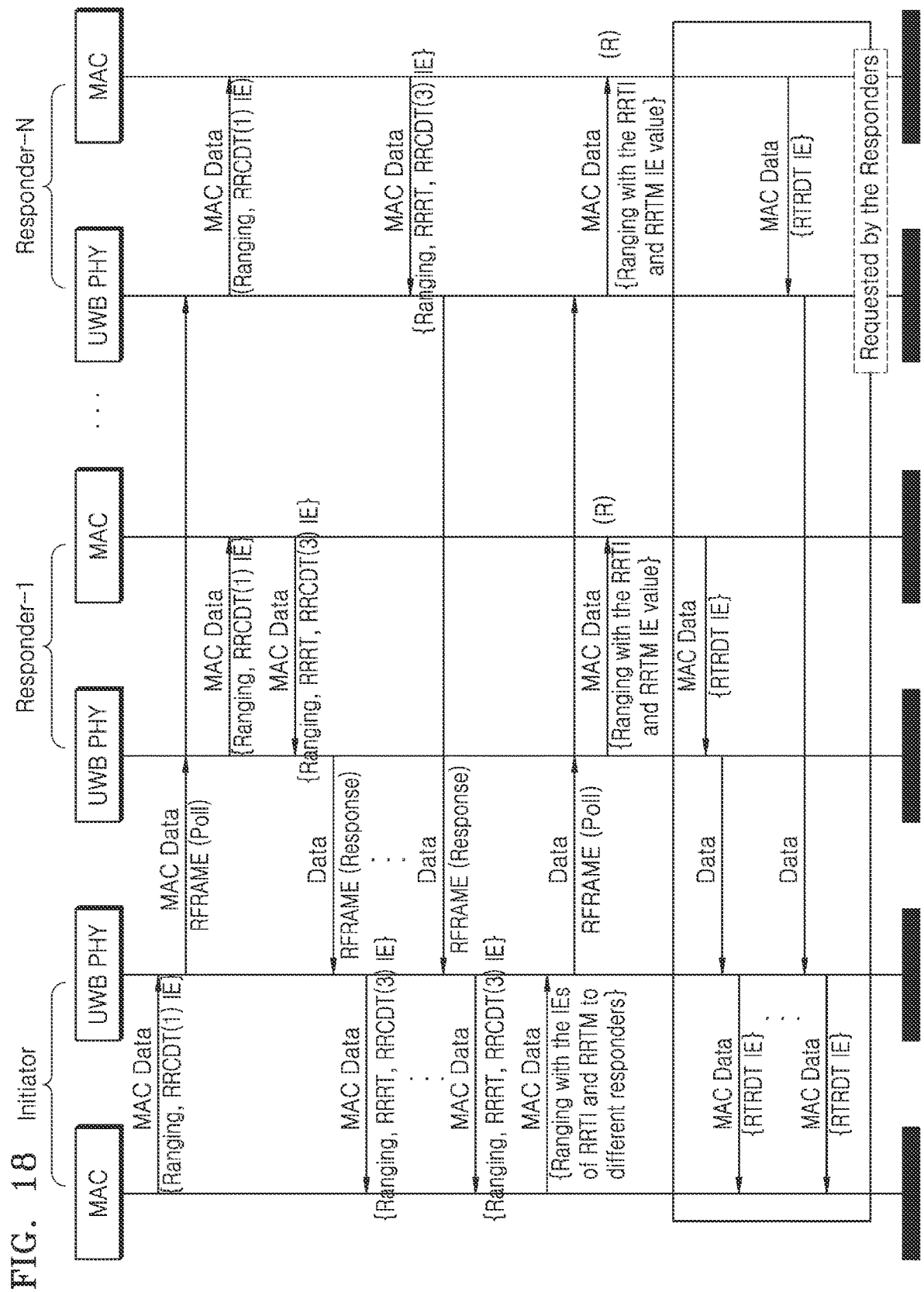
FIG. 18 illustrates an example of a message flowchart of multicast/broadcast double-sided two-way ranging (DS-TWR) according to an embodiment.

In FIG. 18, the initiator may request the ranging result by setting the value of the RRCDT IE to 1. Thus, based on scheduling or contention, the responders may respectively return the first response time and the second round-trip time (RTRDT IE) in separate data frames.

Figure 19:
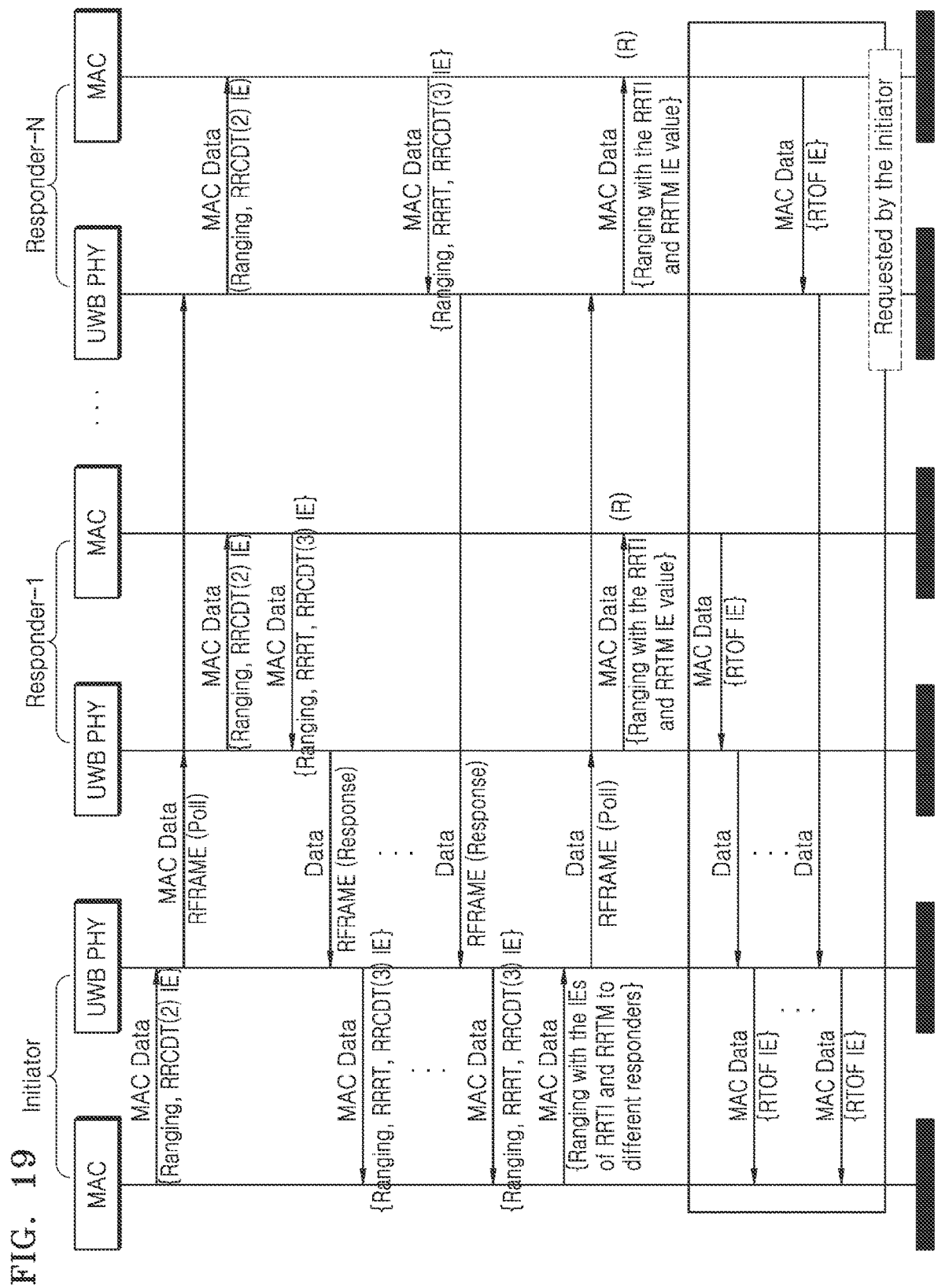
FIG. 19 illustrates an example of a message flowchart of multicast/broadcast double-sided two-way ranging (DS-TWR) according to an embodiment.

In FIG. 19, the initiator may request the ranging result by setting the value of the RRCDT IE to 2. Thus, based on scheduling or contention, the responders may respectively return the ranging results (RTOF IE) in separate data frames.

Figure 20:
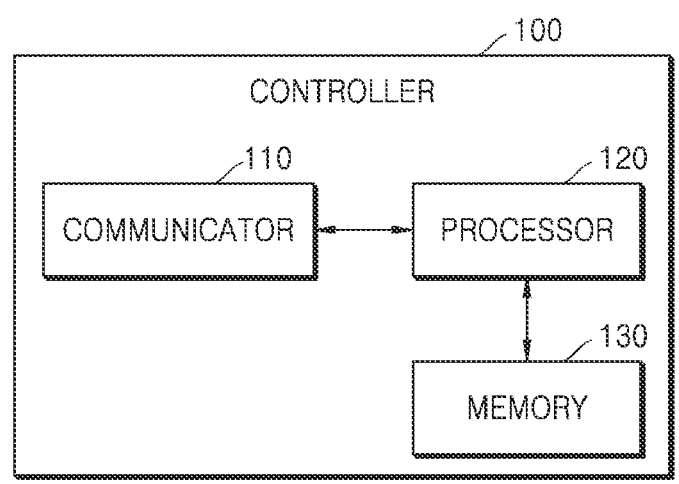
FIG. 20 illustrates a block diagram of a controller according to an embodiment.

FIG. 20 illustrates a block diagram of a controller 100 according to an embodiment.

The controller 100 according to an embodiment may be a fixed terminal or a mobile terminal. The controller 100 may be, for example, at least one of a smart phone, a mobile phone, a navigation device, a computer, a notebook computer, a digital broadcasting terminal, an artificial intelligence speaker, a speaker, a personal digital assistant (PDA), a portable multimedia player (PMP), and a tablet PC, but is not limited thereto. The controller 100 may communicate with other devices and/or servers through a network by using a wireless or wired communication method.

Figure 22:
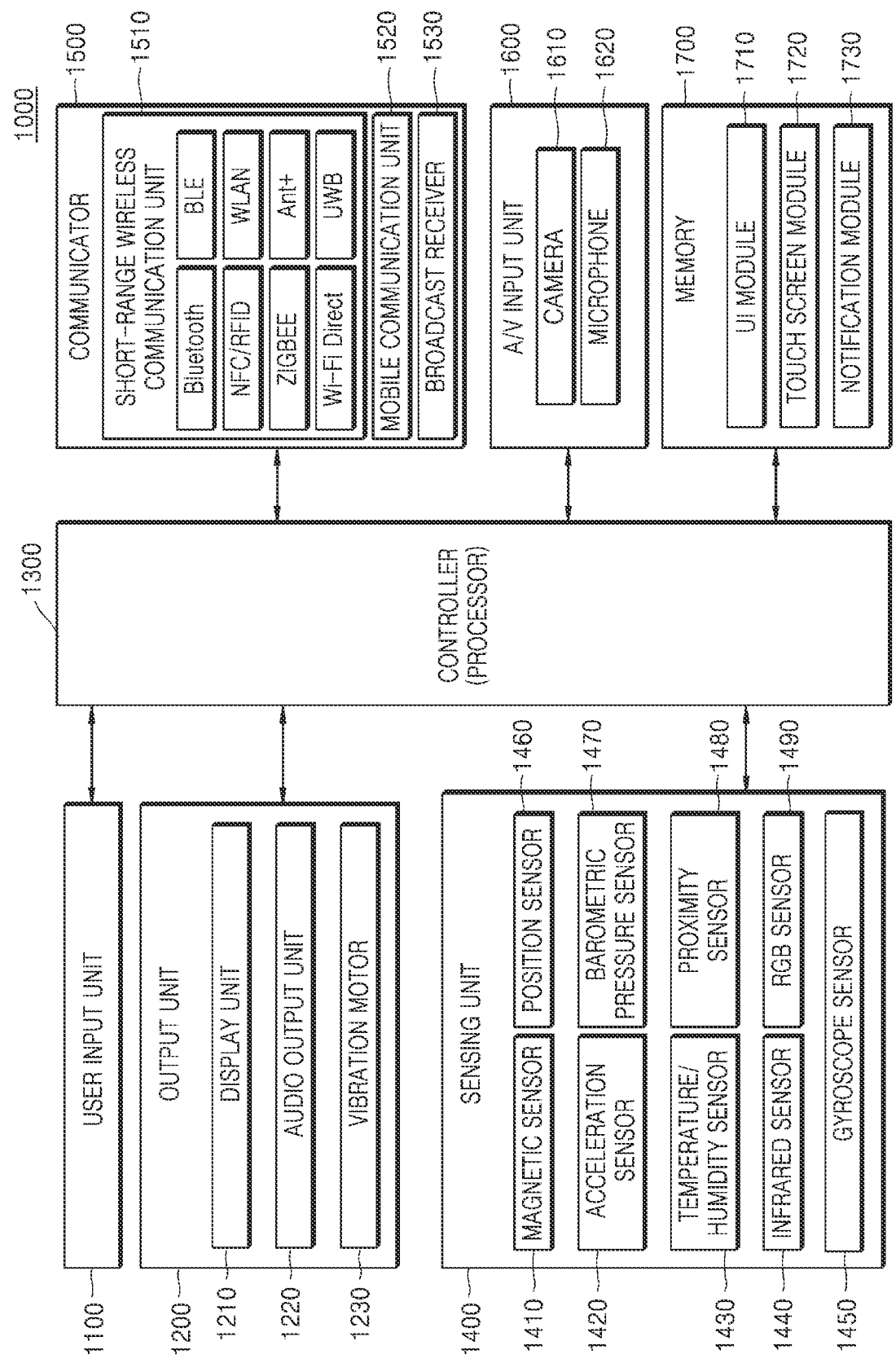
FIG. 22 illustrates a detailed block diagram of an electronic device according to an embodiment.

Referring to FIG. 20, the controller 100 according to an embodiment may include a communicator 110, a processor 120, and a memory 130. However, the controller 100 may be implemented by more components than all the components illustrated in FIG. 20. For example, as illustrated in FIG. 22, the controller 100 according to an embodiment may further include at least one of a user input unit 1100, an output unit 1200, a sensing unit 1400, and an audio/video (A/V) input unit 1600.

In FIG. 20, the controller 100 is illustrated as including one processor; however, embodiments are not limited thereto, and the controller 100 may include a plurality of processors. At least some of the operations and functions of the processor 120 described below may be performed by a plurality of processors. The controller 100 illustrated in FIG. 20 may perform a method of operating the controller 100 according to various embodiments of the disclosure, and the descriptions of FIGS. 4 to 19 may be applied thereto. Thus, redundant descriptions thereof will be omitted for conciseness.

The communicator 110 according to an embodiment of the disclosure may perform wired/wireless communication with other devices or networks. For this purpose, the communicator 110 may include a communication module that supports at least one of various wired/wireless communication methods. For example, the communication module may be in the form of a chipset or may be a sticker/barcode including information necessary for communication (e.g., a sticker including a Near Field Communication (NFC) tag).

The wireless communication may include, for example, at least one of cellular communication, Wireless Fidelity (Wi-Fi), Wi-Fi Direct, Bluetooth, Ultra Wide Band (UWB), or Near Field Communication (NFC). The wired communication may include, for example, at least one of USB or High Definition Multimedia Interface (HDMI).

In an embodiment, the communicator 110 may include a communication module for short-range communication. For example, the communicator 110 may include a communication module for performing various short-range communications such as infrared communication, Magnetic Secure Transmission (MST), and magnetic security communication in addition to UWB, Wi-Fi, Wi-Fi Direct, Bluetooth, and NFC described above.

The communicator 110 according to an embodiment of the disclosure may transmit a first ranging control (RC) frame to the controlee 200. The first ranging control frame according to an embodiment may include information about ranging parameters and information about ranging intervals. For example, the information about ranging parameters may include a ranging control IE, and the information about ranging intervals may include an RIU IE.

The communicator 110 may perform ranging with the controlee 200 for a number of ranging rounds determined based on the first ranging control frame. In an interval mode, a ranging block may include multiple ranging rounds. In this case, the number of active ranging rounds may be designated in a Number of Ranging Round field of a ranging control IE of a ranging control frame.

In the interval mode, each ranging control frame transmitted in a certain ranging round may be applied to the following multiple active ranging rounds in the ranging block by using a Number of Ranging Round field value.

The processor 120 according to an embodiment of the disclosure may control an overall operation of the controller 100 and may include at least one processor such as a CPU or a GPU. The processor 120 may control other components included in the controller 100 to perform UWB ranging. The memory 130 may store one or more programs for processing and controlling the operations of the processor 120 and may store data that is input to the controller 100 or output from the controller 100.

Moreover, when current ranging parameters or current intervals need to be changed, the controlee 200 according to an embodiment may transmit a change request by adding a ranging change request (RCR) IE to a ranging frame. The RCR IE may be transmitted together with the ranging control IE, together with the ranging interval update IE, or together with the ranging control IE and the ranging interval update IE. The communicator 110 of the controller 100 may receive a change request from the controlee 200 together with the preference ranging parameters in the ranging control IE and the preference intervals in the ranging interval update IE.

The processor 120 according to an embodiment may change at least one ranging parameter based on the change request received from the controlee 200. The processor 120 may control the communicator 110 to transmit a second ranging control frame including the changed at least one ranging parameter.

The processor 120 according to an embodiment may identify at least one of information about a preference parameter included in the change request information and information about a preference interval. The processor 120 according to an embodiment may change at least one ranging parameter based on at least one of the information about a preference parameter and the information about a preference interval. The communicator 110 may transmit information about the changed ranging parameter to the controlee 200.

The communicator 110 according to an embodiment may transmit updated interval information through a frame in the ranging round, transmit updated interval information through a frame between the ranging blocks, or transmit updated interval information through a ranging control frame of the next ranging round.

As for a particular method for the processor 120 to perform ranging and change the ranging parameter, the descriptions of FIGS. 4 to 19 may be applied thereto, and redundant descriptions thereof will be omitted for conciseness.

Figure 21:
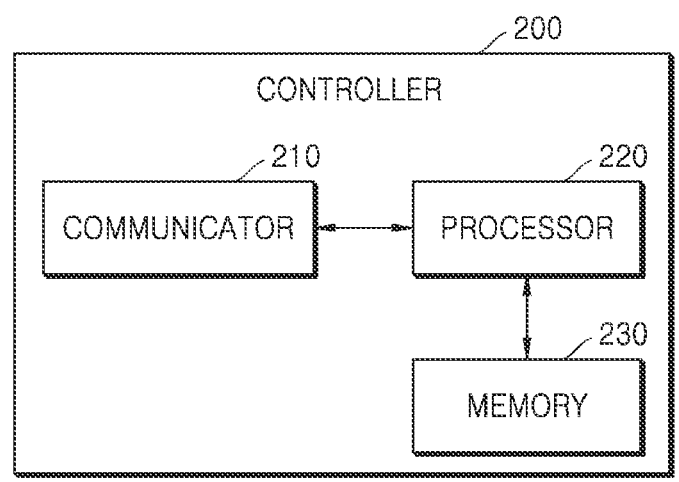
FIG. 21 illustrates a block diagram of a controlee according to an embodiment.

FIG. 21 illustrates a block diagram of a controlee 200 according to an embodiment.

The controlee 200 according to an embodiment may be a fixed terminal or a mobile terminal. The controlee 200 may be, for example, at least one of a smart phone, a mobile phone, a navigation device, a computer, a notebook computer, a digital broadcasting terminal, an artificial intelligence speaker, a speaker, a personal digital assistant (PDA), a portable multimedia player (PMP), and a tablet PC, but is not limited thereto. The controlee 200 may communicate with other devices and/or servers through a network by using a wireless or wired communication method.

Referring to FIG. 21, the controlee 200 according to an embodiment may include a communicator 210, a processor 220, and a memory 230. However, the controlee 200 may be implemented by more components than all the components illustrated in FIG. 21. For example, as illustrated in FIG. 22, the controlee 200 according to some embodiments may further include at least one of a user input unit 1100, an output unit 1200, a sensing unit 1400, and an A/V input unit 1600.

In FIG. 21, the controlee 200 is illustrated as including one processor; however, embodiments are not limited thereto, and the controlee 200 may include a plurality of processors. At least some of the operations and functions of the processor 220 described below may be performed by a plurality of processors. The controlee 200 illustrated in FIG. 21 may perform an operation method according to various embodiments of the disclosure, and the descriptions of FIGS. 4 to 19 may be applied thereto. Thus, redundant descriptions thereof will be omitted for conciseness.

The communicator 210 according to an embodiment of the disclosure may perform wired/wireless communication with other devices or networks. For this purpose, the communicator 210 may include a communication module that supports at least one of various wired/wireless communication methods. For example, the communication module may be in the form of a chipset or may be a sticker/barcode including information necessary for communication (e.g., a sticker including a Near Field Communication (NFC) tag).

The wireless communication may include, for example, at least one of cellular communication, Wireless Fidelity (Wi-Fi), Wi-Fi Direct, Bluetooth, Ultra Wide Band (UWB), or Near Field Communication (NFC). The wired communication may include, for example, at least one of USB or High Definition Multimedia Interface (HDMI).

In an embodiment, the communicator 210 may include a communication module for short-range communication. For example, the communicator 210 may include a communication module for performing various short-range communications such as infrared communication, Magnetic Secure Transmission (MST), and magnetic security communication in addition to UWB, Wi-Fi, Wi-Fi Direct, Bluetooth, and NFC described above.

The communicator 210 according to an embodiment of the disclosure may receive a first ranging control frame from the controller 100. The first ranging control frame according to an embodiment may include information about ranging parameters and information about ranging intervals. For example, the information about ranging parameters may include a ranging control IE, and the information about ranging intervals may include an RIU IE.

The communicator 210 may perform ranging with a first device for a number of ranging rounds determined based on the first ranging control frame and may transmit change request information to the first device. In an interval mode, a ranging block may include multiple ranging rounds. In this case, the number of active ranging rounds may be designated in a Number of Ranging Round field of a ranging control IE of a ranging control frame.

In the interval mode, each ranging control frame transmitted in a certain ranging round may be applied to the following multiple active ranging rounds in the ranging block by using a Number of Ranging Round field value.

The processor 220 according to an embodiment of the disclosure may control an overall operation of the controlee 200 and may include at least one processor such as a CPU or a GPU. The processor 220 may control other components included in the controlee 200 to perform UWB ranging. The memory 230 may store one or more programs for processing and controlling the operations of the processor 220 and may store data that is input to the controlee 200 or output from the controlee 200.

Moreover, when current ranging parameters or current intervals need to be changed, the processor 220 according to an embodiment may transmit a change request by adding a ranging change request (RCR) IE to a ranging frame. The RCR IE may be transmitted together with the ranging control IE, together with the ranging interval update IE, or together with the ranging control IE and the ranging interval update IE. The communicator 210 may transmit a change request to the controller 100 together with the preference ranging parameters in the ranging control IE and the preference intervals in the ranging interval update IE.

The processor 220 according to an embodiment may control the communicator 210 to receive a second ranging control frame based on at least one ranging parameter changed based on the change request information.

The controller 100 may change at least one ranging parameter based on the received change request information. The controlee 200 may receive information about the changed ranging parameter from the controller 100.

The controlee 200 according to an embodiment may receive updated interval information through a frame in the ranging round, receive updated interval information through a frame between the ranging blocks, or receive updated interval information through a ranging control frame of the next ranging round.

As for a particular method for the processor 220 to perform ranging and transmit the change request information, the descriptions of FIGS. 4 to 19 may be applied thereto, and redundant descriptions thereof will be omitted for conciseness.

FIG. 22 illustrates a detailed block diagram of an electronic device according to an embodiment.

A device 1000 illustrated in FIG. 22 may include the same components as the controller 100 illustrated in FIG. 20 and the controlee 200 illustrated in FIG. 21. For example, among the components illustrated in FIG. 22, a controller 1300 may be the same as the processor 120 illustrated in FIG. 20 or the processor 220 illustrated in FIG. 21. Among the components illustrated in FIG. 22, a communicator 1500 may be the same as the communicator 110 illustrated in FIG. 20 or the communicator 210 illustrated in FIG. 21. Among the components illustrated in FIG. 22, a memory 1700 may be the same as the memory 130 illustrated in FIG. 20 or the memory 230 illustrated in FIG. 21.

The device 1000 illustrated in FIG. 22 may perform all of the operations and functions of the controller 100 or the controlee 200 described above. Thus, hereinafter, the components of the device 1000 that have not been described above will be described.

Referring to FIG. 22, the device 1000 may include a user input unit 1100, an output unit 1200, a controller 1300, a sensing unit 1400, a communicator 1500, an A/V input unit 1600, and a memory 1700.

The user input unit 1100 may refer to a unit through which the user inputs data for controlling the device 1000. For example, the user input unit 1100 may include, but is not limited to, a key pad, a dome switch, a touch pad (e.g., a capacitive overlay type, a resistive overlay type, an infrared beam type, a surface acoustic wave type, an integral strain gauge type, or a piezoelectric type), a jog wheel, and a jog switch. The user input unit 1100 may receive a user input necessary to generate conversation information to be provided to the user.

The output unit 1200 may output an audio signal, a video signal, or a vibration signal and may include a display unit 1210, an audio output unit 1220, and a vibration motor 1230. The output unit 1200 according to an embodiment may inform the user that the device 1000 is in a high-attenuation state. For example, the output unit 1200 may induce the device 1000 in the user's pocket to be taken out for accurate ranging.

The vibration motor 1230 may output a vibration signal. For example, the vibration motor 1230 may output a vibration signal corresponding to the output of audio data or video data (e.g., a call signal reception sound or a message reception sound).

The sensing unit 1400 may sense a state of the device 1000 or a state around the device 1000 and transmit the sensed information to the controller 1300.

The sensing unit 1400 may include at least one of a magnetic sensor 1410, an acceleration sensor 1420, a temperature/humidity sensor 1430, an infrared sensor 1440, a gyroscope sensor 1450, and a position sensor (e.g., GPS) 1460, a barometric pressure sensor 1470, a proximity sensor 1480, and an RGB sensor (illuminance sensor) 1490 but is not limited thereto.

The sensing unit 1400 according to an embodiment may sense the movement of the device 1000. The controller 1300 may change a transmission period of an initial connection message to be short when the movement of the device 1000 is sensed, and may change the transmission period of the initial connection message to be long when the movement of the device 1000 is not sensed for a certain time. Because the function of each sensor may be intuitively inferred from its name by those of ordinary skill in the art, redundant descriptions thereof will be omitted for conciseness.

The communicator 1500 may include a component for performing communication with other devices. For example, the communicator 1500 may include a short-range wireless communication unit 1510, a mobile communication unit 1520, and a broadcast receiver 1530.

The short-range wireless communication unit 1510 may include, but is not limited to, a Bluetooth communication unit, a Bluetooth Low Energy (BLE) communication unit, a near field communication unit, a WLAN (WiFi) communication unit, a ZigBee communication unit, an infrared data association (IrDA) communication unit, a WiFi Direct (WFD) communication unit, an Ultra Wideband (UWB) communication unit, and/or an Ant+ communication unit.

The mobile communication unit 1520 may transmit/receive wireless signals to/from at least one of a base station, an external terminal, or a server on a mobile communication network. Here, the wireless signals may include voice call signals, video call signals, or various types of data according to transmission/reception of text/multimedia messages.

The broadcast receiver 1530 may receive broadcast signals and/or broadcast-related information from the outside through broadcast channels. The broadcast channels may include satellite channels and terrestrial channels. In some embodiments, the device 1000 may not include the broadcast receiver 1530.

The A/V input unit 1600 may be for inputting an audio signal or a video signal and may include a camera 1610 and a microphone 1620. The camera 1610 may obtain an image frame such as a still image or a moving image through an image sensor in a video call mode or a photographing mode. The image obtained through the image sensor may be processed through the controller 1300 or a separate image processor (not illustrated).

The image frame processed by the camera 1610 may be stored in the memory 1700 or may be transmitted to the outside through the communicator 1500. Two or more cameras 1610 may be provided according to the configurations of the terminal.

The microphone 1620 may receive an external audio signal and process the same into electrical voice data. For example, the microphone 1620 may receive an audio signal from an external device or a speaker. The microphone 1620 may use various noise removal algorithms for removing the noise generated in the process of receiving the external audio signal.

The memory 1700 may store one or more programs for processing and controlling the operations of the controller 1300 and may store data that is input to the device 1000 or output from the device 1000.

The memory 1700 may include at least one type of storage medium among flash memory type memory, hard disk type memory, multimedia card micro type memory, card type memory (e.g., SD or XD memory), RAM, SRAM, ROM, EEPROM, PROM, magnetic memory, magnetic disk, and optical disk.

The programs stored in the memory 1700 may be classified into a plurality of modules according to their functions and may be classified into, for example, a user interface (UI) module 1710, a touch screen module 1720, and a notification module 1730.

The UI module 1710 may provide a specialized UI, a graphical user interface (GUI), or the like that interoperates with the device 1000 for each application. The touch screen module 1720 may sense a user's touch gesture on a touch screen and transmit information about the touch gesture to the controller 1300. The touch screen module 1720 according to some embodiments may recognize and analyze a touch code. The touch screen module 1720 may include separate hardware including a controller.

The notification module 1730 may generate a signal for notifying the occurrence of an event in the device 1000. Examples of the event occurring in the device 1000 may include call signal reception, message reception, key signal input, and schedule notification.

The described embodiments of the disclosure may be implemented as S/W programs including instructions stored in computer-readable storage mediums.

The computer may be a device capable of calling stored instructions from a storage medium and performing operations of the described embodiments according to the called instructions and may include an image transmitting device and an image receiving device according to the described embodiments.

The computer-readable storage mediums may be provided in the form of non-transitory storage mediums. Here, 'non-transitory' may merely mean that the storage mediums do not include signals and are tangible, but does not distinguish semi-permanent or temporary storage of data in the storage mediums.

Also, the electronic devices and methods according to the described embodiments may be included and provided in a computer program product. The computer program product may be traded as a product between a seller and a buyer.

The computer program product may include a S/W program and a computer-readable storage medium with a S/W program stored therein. For example, the computer program product may include products in the form of S/W programs (e.g., downloadable apps) electronically distributed through manufacturers of electronic devices or electronic markets (e.g., Google Play Store and App Store), For electronic distribution, at least a portion of the S/W program may be stored in a storage medium or may be temporarily generated. In this case, the storage medium may be a storage medium of a server of a manufacturer, a server of an electronic market, or a relay server for temporarily storing the S/W program.

In a system including a server and a terminal (e.g., an image transmitting device or an image receiving device), the computer program product may include a storage medium of the server or a storage medium of the terminal. Alternatively, when there is a third device (e.g., a smartphone) communicatively connected to the server or the terminal, the computer program product may include a storage medium of the third device. Alternatively, the computer program product may include the S/W program itself that is transmitted from the server to the terminal or the third device or transmitted from the third device to the terminal.

In this case, one of the server, the terminal, and the third device may execute the computer program product to perform the methods according to the described embodiments. Alternatively, two or more of the server, the terminal, and the third device may execute the computer program product to perform the methods according to the described embodiments in a distributed manner.

For example, the server (e.g., a cloud server or an artificial intelligence server) may execute the computer program product stored in the server, to control the terminal communicatively connected to the server to perform the methods according to the described embodiments.

As another example, the third device may execute the computer program product to control the terminal communicatively connected to the third device to perform the methods according to the described embodiments. As a particular example, the third device may remotely control an image transmitting device or an image receiving device to transmit or receive a packed image.

When the third device executes the computer program product, the third device may download the computer program product from the server and execute the downloaded computer program product. Alternatively, the third device may perform the methods according to the described embodiments by executing the computer program product provided in a preloaded state.

The invention claimed is:

1. A method performed by a first device using ultra-wide band (UWB), the method comprising:
transmitting a first ranging control (RC) frame to a second device, wherein the first RC frame comprises a ranging control information element including information related to a number of ranging rounds and a ranging interval update information element including information about a ranging interval;
performing a ranging procedure with the second device in at least one ranging round of the ranging rounds based on the ranging control information element, wherein the ranging procedure is performed by one of single-sided two-way ranging, double-sided two-way ranging, or one-way ranging;
receiving a change request to request change of at least one ranging parameter related to the ranging control information element or at least one ranging interval related to the ranging interval update information element from the second device;
determining whether to accept the change request; and
transmitting a second RC frame for updating, the second RC frame including an updated ranging parameter or an updated ranging interval based on determining to accept the change request.

2. The method of claim 1, wherein the first RC frame includes information about at least one of a multiplier for a minimum block length, a minimum block length, the number of ranging rounds, a ranging round length, and a ranging slot length.

3. The method of claim 1, wherein the second device comprises at least one controlee.

4. The method of claim 1,
wherein the ranging interval update information element includes information about at least one of a block interval, a round interval, a ranging interval update (RIU) interval, and a number of RIU frames remaining until transmission of a next RC frame.

5. The method of claim 1, further comprising:
transmitting, to the second device, a poll frame for starting ranging; and
receiving a response frame from the second device.

6. The method of claim 1, further comprising:
receiving, from the second device, a poll frame for starting ranging; and
transmitting a response frame to the second device.

7. The method of claim 1, further comprising:
identifying at least one of information about a preference parameter and information about a preference interval included in the change request; and
changing the at least one ranging parameter based on the information about the preference parameter or the at least one ranging interval based on the information about the preference interval.

8. The method of claim 1,
wherein the second RC frame is transmitted at an end time of a ranging round.

9. The method of claim 1,
wherein the second RC frame is transmitted at a time determined based on the updated ranging interval.

10. A method performed by a second device using ultra-wide band (UWB), the method comprising:
receiving a first ranging control (RC) frame from a first device, wherein the first RC frame comprises a ranging control information element including information related to a number of ranging rounds and a ranging interval update information element including information about a ranging interval;
performing a ranging procedure with the first device in at least one ranging round of the ranging rounds based on the ranging control information element, wherein the ranging procedure is performed by one of single-sided two-way ranging, double-sided two-way ranging, or one-way ranging;
transmitting a change request to request change of at least one ranging parameter related to the ranging control information element or at least one ranging interval related to the ranging interval update information element to the first device; and
receiving a second RC frame for updating, the second RC frame including an updated ranging parameter or an updated ranging interval.

11. The method of claim 10, wherein the first RC frame includes information about at least one of a multiplier for a minimum block length, a minimum block length, the number of ranging rounds, a ranging round length, and a ranging slot length.

12. The method of claim 10,
wherein the ranging interval update information element includes information about at least one of a block interval, a round interval, a ranging interval update (RIU) interval, and a number of RIU frames remaining until transmission of a next RC frame.

13. The method of claim 10, further comprising:
transmitting, to the first device, a poll frame for starting ranging; and
receiving a response frame from the first device.

14. The method of claim 10, further comprising:
receiving, from the first device, a poll frame for starting ranging; and
transmitting a response frame to the first device.

15. The method of claim 10, wherein the change request is transmitted together with at least one of information about a ranging parameter and information about a ranging interval.

16. The method of claim 10,
wherein the second RC frame is received at an end time of a ranging round.

17. The method of claim 10,
wherein the second RC frame is received at a time determined based on the updated ranging interval.

18. A first device using ultra-wide band (UWB), the first device comprising:
a communicator;
a memory; and
at least one processor configured to control an operation of the first device by executing a program stored in the memory,
wherein the at least one processor is configured to:
control the communicator to transmit a first ranging control (RC) frame to a second device, wherein the first RC frame comprises a ranging control information element including information related to a number of ranging rounds and a ranging interval update information element including information about a ranging interval,
perform a ranging procedure with the second device in at least one ranging round of the ranging rounds based on the ranging control information element, wherein the ranging procedure is performed by one of single-sided two-way ranging, double-sided two-way ranging, or one-way ranging, receive a change request to request change of at least one ranging parameter related to the ranging control information element or at least one ranging interval related to the ranging interval update information element from the second device, determine whether to accept the change request, and control the communicator to transmit a second RC frame for updating, the second RC frame including an updated ranging parameter or an updated ranging interval based on determining to accept the change request.

* * * * *